United States Patent
Obuchi et al.

(10) Patent No.: US 9,198,086 B2
(45) Date of Patent: Nov. 24, 2015

(54) RADIO COMMUNICATION METHOD, RELAY STATION, MOBILE STATION, AND MOBILE COMMUNICATION SYSTEM

(71) Applicant: FUJITSU LIMITED, Kawasaki-shi, Kanagawa (JP)

(72) Inventors: Kazuhisa Obuchi, Yokohama (JP); Yoshihiro Kawasaki, Kawasaki (JP); Yoshiaki Ohta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 156 days.

(21) Appl. No.: 13/856,073

(22) Filed: Apr. 3, 2013

(65) Prior Publication Data

US 2013/0225175 A1 Aug. 29, 2013

Related U.S. Application Data

(63) Continuation of application No. PCT/JP2010/069582, filed on Nov. 4, 2010.

(51) Int. Cl.
*H04W 36/00* (2009.01)
*H04B 7/155* (2006.01)
*H04W 56/00* (2009.01)
*H04W 84/04* (2009.01)

(52) U.S. Cl.
CPC ........... *H04W 36/00* (2013.01); *H04B 7/15507* (2013.01); *H04W 36/0072* (2013.01); *H04W 56/0045* (2013.01); *H04W 84/047* (2013.01)

(58) Field of Classification Search
CPC .................................................... H04W 36/18
USPC ........................................................ 455/436
See application file for complete search history.

(56) References Cited

U.S. PATENT DOCUMENTS

| 7,801,081 B2 * | 9/2010 | Choi et al. ................. 370/331 |
| 8,059,603 B2 * | 11/2011 | Jin ............................... 370/331 |
| 2007/0293224 A1 | 12/2007 | Wang et al. |
| 2011/0211521 A1 | 9/2011 | Baba et al. |

FOREIGN PATENT DOCUMENTS

| AU | 2007261342 | 12/2007 |
| AU | 2010200888 | 4/2010 |

(Continued)

OTHER PUBLICATIONS

3GPP TR 36.912 V9.0.0; 3rd Generation Partnership Project; Technical Specification Group Radio Access Network; "Feasibility study for Further Advancements for E-UTRA (LTE-Advanced) (Release 9)"; Sep. 2009.

(Continued)

*Primary Examiner* — Huy C Ho
(74) *Attorney, Agent, or Firm* — Myers Wolin, LLC

(57) ABSTRACT

In a mobile communication system, a relay station connects to a first or second base station, and communicates with a mobile station at a timing corresponding to the destination base station. Before execution of a handover for switching a destination of the relay station from the first base station to the second base station, the relay station transmits a signal regarding the second base station. The mobile station synchronizes with the relay station after execution of the handover, on the basis of the signal regarding the second base station which is received from the relay station before the handover.

9 Claims, 23 Drawing Sheets

(56) References Cited

FOREIGN PATENT DOCUMENTS

| | | |
|---|---|---|
| CA | 2655954 | 12/2007 |
| EP | 2039211 | 3/2009 |
| JP | 09-121188 | 5/1997 |
| JP | 2001-061174 | 3/2001 |
| JP | 2001-128208 | 5/2001 |
| JP | 2009-542100 | 11/2009 |
| JP | 2010-056934 | 3/2010 |
| JP | 2010-161792 | 7/2010 |
| WO | 2007/149509 | 12/2007 |

OTHER PUBLICATIONS

3GPP TS 36.211 V9.1.0; 3rd Generation Partnership Project; Technical Specification Group Radio Access Network; Evolved Universal Terrestrial Radio Access (E-UTRA); "Physical Channels and Modulation (Release 9)"; Mar. 2010.

3GPP TS 36.213 V9.1.0; 3rd Generation Partnership Project; Technical Specification Group Radio Access Network; Evolved Universal Terrestrial Radio Access (E-UTRA); "Physical layer procedures (Release 9)"; Mar. 2010.

3GPP TS 36.331 V9.2.0; 3rd Generation Partnership Project; Technical Specification Group Radio Access Network; Evolved Universal Terrestrial Radio Access (E-UTRA); Radio Resource Control (RRC); "Protocol specification (Release 9)"; Mar. 2010.

International search report issued for corresponding International Patent Application No. PCT/JP2010/069582, mailed Dec. 14, 2010.

Mikio Iwamura et al.; "Relay Technology in LTE-Advanced"; NTT DOCOMO Technical Journal vol. 12 No. 2, pp. 29-36.

Mikio Iwamura et al.; "Relay Technology in LTE-Advanced"; NTT DOCOMO Technical Journal vol. 18 No. 2, pp. 31-36. Corresponds to "Relay Technology in LTE-Advanced," NTT DOCOMO Technical Journal vol. 12 No. 2, pp. 29-36.

* cited by examiner

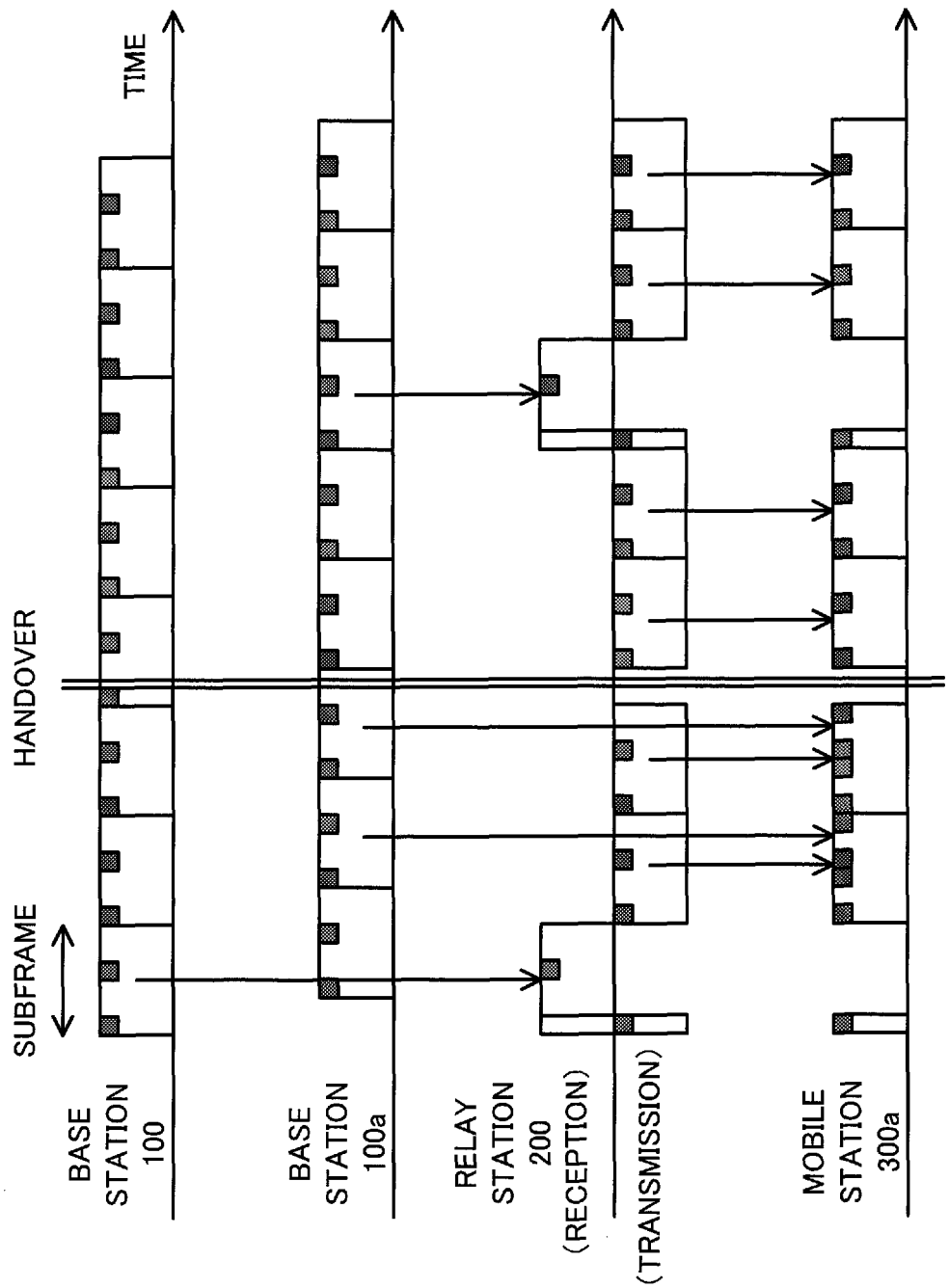

RADIO COMMUNICATION METHOD, RELAY STATION, MOBILE STATION, AND MOBILE COMMUNICATION SYSTEM

CROSS-REFERENCE TO RELATED APPLICATION

This application is a continuation application of International Application PCT/JP2010/069582 filed on Nov. 4, 2010 which designated the U.S., the entire contents of which are incorporated herein by reference.

FIELD

The present invention relates to a radio communication method, a relay station, a mobile station, and a mobile communication system.

BACKGROUND

Mobile communication systems such as cellular phone systems are now widely used. Meanwhile, in order to increase the speed and capacity of radio communication, there have been lively discussions on the next-generation mobile communication technology. For example, a standard called Long Term Evolution (LTE) has been proposed by the international standardization organization 3rd Generation Partnership Project (3GPP) (see, for example, 3rd Generation Partnership Project, "Evolved Universal Terrestrial Radio Access (E-UTRA); Physical Channels and Modulation", 3GPP TS 36.211 V9.1.0, 2010-03., 3rd Generation Partnership Project, "Evolved Universal Terrestrial Radio Access (E-UTRA); Physical layer procedures", 3GPP TS 36.213 V9.1.0, 2010-03. and 3rd Generation Partnership Project, "Evolved Universal Terrestrial Radio Access (E-UTRA); Radio Resource Control (RRC); Protocol specification", 3GPP TS 36.331 V9.2.0, 2010-03.). Further, a standard called Long Term Evolution-Advanced (LTE-A) as an evolution of LTE has also been proposed (see, for example, 3rd Generation Partnership Project, "Feasibility study for Further Advancements for E-UTRA", 3GPP TR 36.912 V9.0.0, 2009-09.).

In mobile communication systems, a relay station is often provided so as to relay communication between a base station and a mobile station. The provision of the relay station may expand the cell area and improve the throughput. However, in the relay station, interference (self-interference) might occur between a reception signal and a transmission signal of the relay station. For instance, in the case where the frequency bandwidth used for communication between the base station and the relay station overlaps the frequency bandwidth used for communication between the relay station and the mobile station, a radio signal transmitted to the mobile station might be input to a reception circuit of the relay station, so that a radio signal from the base station might not be successfully received. To solve this problem, there has been proposed a technique that prevents self-interference by adjusting the timing of communicating with a base station and the timing of communicating with a mobile station (see, for example, Section 9 of 3rd Generation Partnership Project, "Feasibility study for Further Advancements for E-UTRA", 3GPP TR 36.912 V9.0.0, 2009-09.).

In a mobile communication system in which a base station and a mobile station communicate with each other via a relay station, a relay station may perform a handover so as to switch the destination base station. For example, in the case where a relay station is mounted on a vehicle such as a train and an automobile, if a mobile station is carried by a passenger in the vehicle and performs communication via a relay station, although a handover for switching the destination of the mobile station does not occur, a handover for switching the destination of the relay station may occur.

In this case, the handover by the relay station affects communication of the mobile station, which becomes a problem. For example, in some cases, the transmission timing of frames and symbols may vary between base stations. When the relay station performs a handover, transmission timing of frames and symbols from the relay station to the mobile station may be changed in accordance with the destination base station. The relay station that is to perform a handover may detect in advance a transmission timing of a base station to be applied after the handover, and may prepare for synchronization before the handover. On the other hand, when the handover is performed by the relay station, the mobile station connected to the relay station may suddenly become out of synchronization. When the mobile station determines that the mobile station is out of synchronization with the relay station, the mobile station may again perform a process of establishing synchronization, such as cell search, for example. Thus, the time lag taken by the mobile station to resume communication becomes a problem.

SUMMARY

According to an aspect of the embodiments to be discussed herein, there is provided a radio communication method for a mobile communication system in which a relay station connects to a first or second base station as a destination and communicates with a mobile station at a timing corresponding to the destination base station. This method includes: transmitting, by the relay station, a signal regarding the second base station, before execution of a handover for switching the destination of the relay station from the first base station to the second base station; and establishing, by the mobile station, synchronization with the relay station after execution of the handover, on the basis of the signal regarding the second base station which is received from the relay station before the handover.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 23 illustrates an example of reception of pilot signals according to the fourth embodiment.

DESCRIPTION OF EMBODIMENTS

Embodiments of the present invention will be explained below with reference to the accompanying drawings.

First Embodiment

Figure 1:
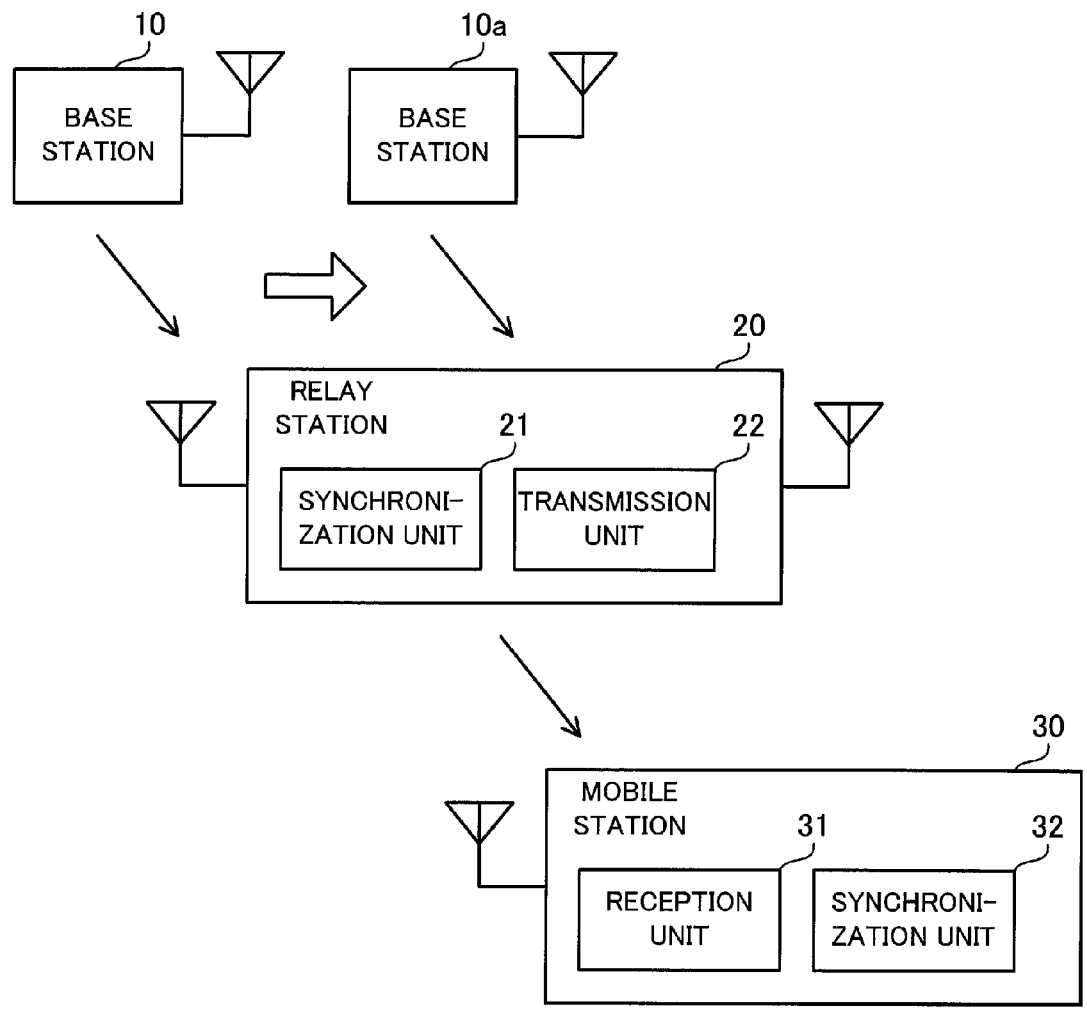
FIG. 1 illustrates a mobile communication system according to a first embodiment.

FIG. 1 illustrates a mobile communication system according to a first embodiment. The radio communication system of the first embodiment includes base stations 10 and 10a, a relay station 20, and a mobile station 30. The mobile station 30 connects to the relay station 20. The relay station 20 connects to the base station 10 or the base station 10a so as to relay communication of the mobile station 30. The relay station 20 may be a mobile radio apparatus, for example.

The relay station 20 includes a synchronization unit 21 and a transmission unit 22. The synchronization unit 21 establishes synchronization with the base station 10. Further, when a handover for switching the destination from the base station 10 to the base station 10a is executed, the synchronization unit establishes synchronization with the base station 10a. The synchronization unit 21 may detect a communication timing (a timing of frames and symbols, for example) of the base station 10a (may tentatively synchronize with the base station 10a), before the handover. The transmission unit 22 transmits a signal regarding the base station 10a, before the handover.

The mobile station 30 includes a reception unit 31 and a synchronization unit 32. The reception unit 31 receives a radio signal from the relay station 20 that connects to the base station 10 or the base station 10a. The synchronization unit 32 obtains (via the reception unit 31, for example) a signal regarding the base station 10a, which has been transmitted from the relay station 20, before the handover is executed. Then, the synchronization unit 32 establishes synchronization with the relay station 20 after execution of the handover, on the basis of the obtained signal regarding the base station 10a.

The signal regarding the base station 10a may include a pilot signal that is transmitted at a timing corresponding to the communication timing of the base station 10a, for example. In this case, the relay station 20 transmits a pilot signal corresponding to the base station 10 and a pilot signal corresponding to the base station 10a, before the handover. These two pilot signals may be the same, or may be different from each other. The mobile station 30 may detect the pilot signal corresponding to the base station 10a, and thus may calculate a communication timing of the relay station 20 to be applied after the handover.

Further, the signal regarding the base station 10a may include time difference information indicating the difference between the communication timing of the base station 10 and the communication timing of the base station 10a. In this case, the relay station 20 calculates the difference in timing and transmits time difference information to the mobile station 30, before the handover. The mobile station 30 may receive the time difference information from the relay station 20, and thus may calculate a communication timing of the relay station 20 to be applied after the handover.

Further, the signal regarding the base station 10a may include information for instructing the mobile station 30 to receive a radio signal transmitted from the base station 10a. In this case, the mobile station 30 detects a radio signal (for example, pilot signal) transmitted from the base station 10a in accordance with the instruction from the relay station 20, and calculates the communication timing of the relay station 20 to be applied after the handover, on the basis of the detection results.

In the above-described mobile communication system of the first embodiment, before executing a handover for switching a destination of the relay station 20 from the base station 10 to the base station 10a, the relay station 20 transmits a signal regarding the base station 10a. The mobile station 30 synchronizes with the relay station 20 after execution of the handover, on the basis of the signal regarding the base station 10a that has been received from the relay station 20 before the handover.

Thus, even when the relay station 20 performs a handover, it is possible to prevent the mobile station 30 that performs radio communication through connection to the relay station 20 from being affected by the handover. That is, before a handover by the relay station 20, the mobile station 30 may obtain a signal regarding the base station 10a from the relay station 20, and may calculate a communication timing of the relay station 20 to be applied after the handover. Therefore, the mobile station 30 may prepare for synchronization before the handover. Also, it becomes possible to prevent operations for establishing synchronization, such as cell search, from occurring after the handover. Accordingly, it is possible to reduce the time lag between execution of a handover by the relay station 20 and resumption of communication by the mobile station 30.

Second Embodiment

Figure 2:
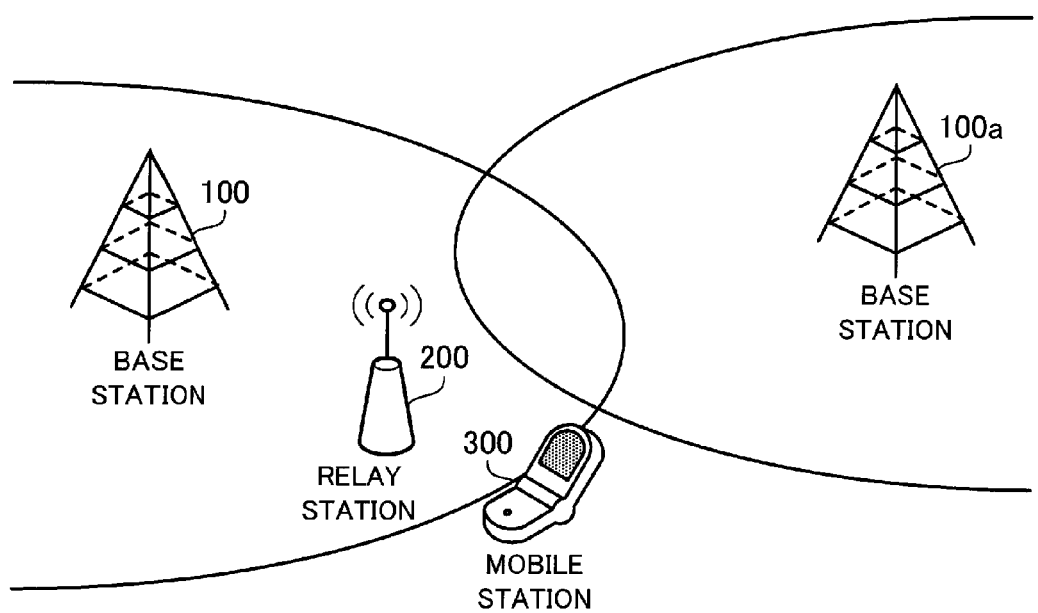
FIG. 2 illustrates a mobile communication system according to a second embodiment.

FIG. 2 illustrates a mobile communication system according to a second embodiment. The mobile communication system of the second embodiment includes base stations 100 and 100a, a relay station 200, and a mobile station 300. The mobile station 300 communicates with the base stations 100 and 100a via the relay station 200.

The base stations 100 and 100a are radio communication apparatuses that communicate with the relay station 200 by radio. The base stations 100 and 100a are connected to a wired network (not illustrated). The base stations 100 and 100a transfer data transmitted from and data to be received by the mobile station 300, between the wired network and the relay station 200. In the second embodiment, it is assumed that the base station 100 and the base station 100a transmit frames and symbols at different timings.

The relay station 200 is a radio communication apparatus that connects to the base station 100 or the base station 100a so as to relay communication between a destination base station and the mobile station 300. The relay station 200 synchronizes with the destination base station, and transmits frames and symbols to the mobile station 300 at a timing corresponding to the synchronization status of the base station side. The relay station 200 transfers data and control information between the destination base station and the mobile station 300. In the second embodiment, it is assumed that the relay station 200 is a mobile relay station (for example, a relay station mounted on a vehicle such as a train and an automobile) and performs a handover for switching the destination from the base station 100 to the base station 100a.

The mobile station 300 connects to the relay station 200, and communicates with the base stations 100 and 100a via the relay station 200. Examples of the mobile station 300 include cellular phones and mobile information terminals. The mobile station 300 synchronizes with the relay station 200 so as to transmit data to the relay station 200 and receive data from the relay station 200.

Figure 3:
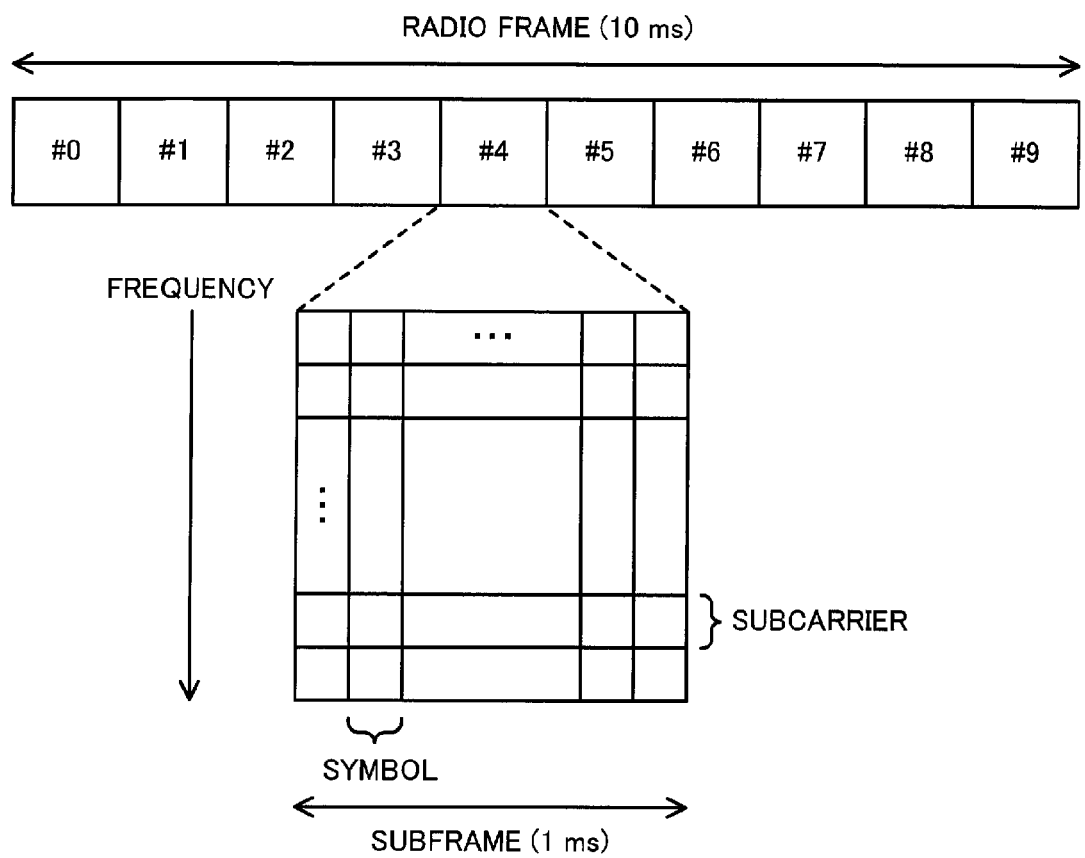
FIG. 3 illustrates an exemplary structure of a radio frame.

FIG. 3 illustrates an exemplary structure of a radio frame. A Radio frame as illustrated in FIG. 3 is transmitted through each of a communication link (downlink (DL)) from the base stations 100 and 100a toward the mobile station 300 and a communication link (uplink (UL)) from the mobile station 300 toward the base stations 100 and 100a. In the second embodiment, it is assumed that frequency division duplex (FDD) is used as a duplex system. However, time division duplex (TDD) may alternatively be used.

One radio frame having a length of 10 ms contains ten subframes (subframes #0 through #9) each having a length of 1 ms. The radio resource of each subframe is subdivided in the frequency direction and the time direction so as to be managed. The smallest unit in the frequency direction is a subcarrier, and the smallest unit in the time direction is a symbol. The subdivided radio resources are allocated to various channels. Transmission of data and control information is scheduled in units of subframes.

In a downlink radio frame, a physical downlink shared channel (PDSCH), a physical downlink control channel (PDCCH), a physical broadcast channel (PBCH), and so on are transmitted as physical channels. The PDSCH is a channel for transmitting data. The PDCCH is a channel for transmitting a control signal of the physical layer. A few symbols (one through three symbols) from the top of the subframe are allocated to the PDCCH. The PBCH is a channel for transmitting broadcast information such as system information. Further, in the radio frame, a pilot signal such as a reference signal (RS) is transmitted. The pilot signal is referred to in order to measure the received power level and the radio line quality, and to establish synchronization.

Figure 4:
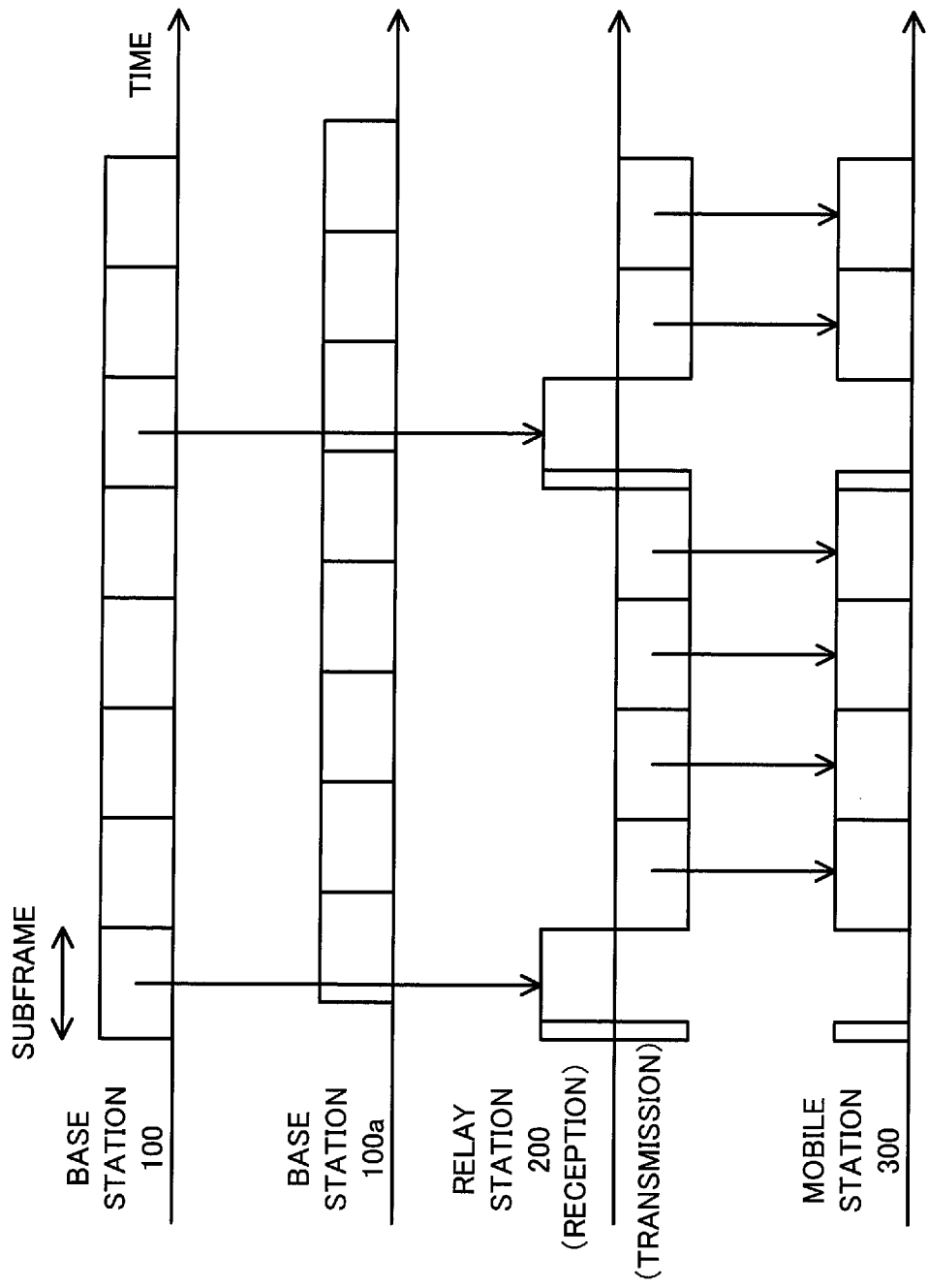
FIG. 4 illustrates exemplary communication timing of a relay station.

FIG. 4 illustrates exemplary communication timing of the relay station. In order to prevent self-interference, the relay station 200 performs a control operation to prevent reception of radio signals from the base stations 100 and 100a and transmission of radio signals to the mobile station 300 from being performed at the same time.

That is, the relay station 200 selects subframes for receiving radio signals from the base stations 100 and 100a. Then, transmission of radio signals to the mobile station 300 is stopped in the selected subframes, and radio signals are transmitted to the mobile station 300 in subframes other than the selected subframes. However, in a control resource area allocated to the PDCCH, the relay station 200 may transmit radio signals to the mobile station 300 even in subframes for receiving radio signals from the base stations 100 and 100a.

Note that the relay station 200 has agreed in advance with the base stations 100 and 100a on selection of subframes for receiving radio signals from the base stations 100 and 100a. Further, in uplink communication, as in the case of downlink, the relay station 200 performs a control operation to prevent reception of radio signals from the mobile station 300 and transmission of radio signals to the base stations 100 and 100a from being performed at the same time.

Figure 5:
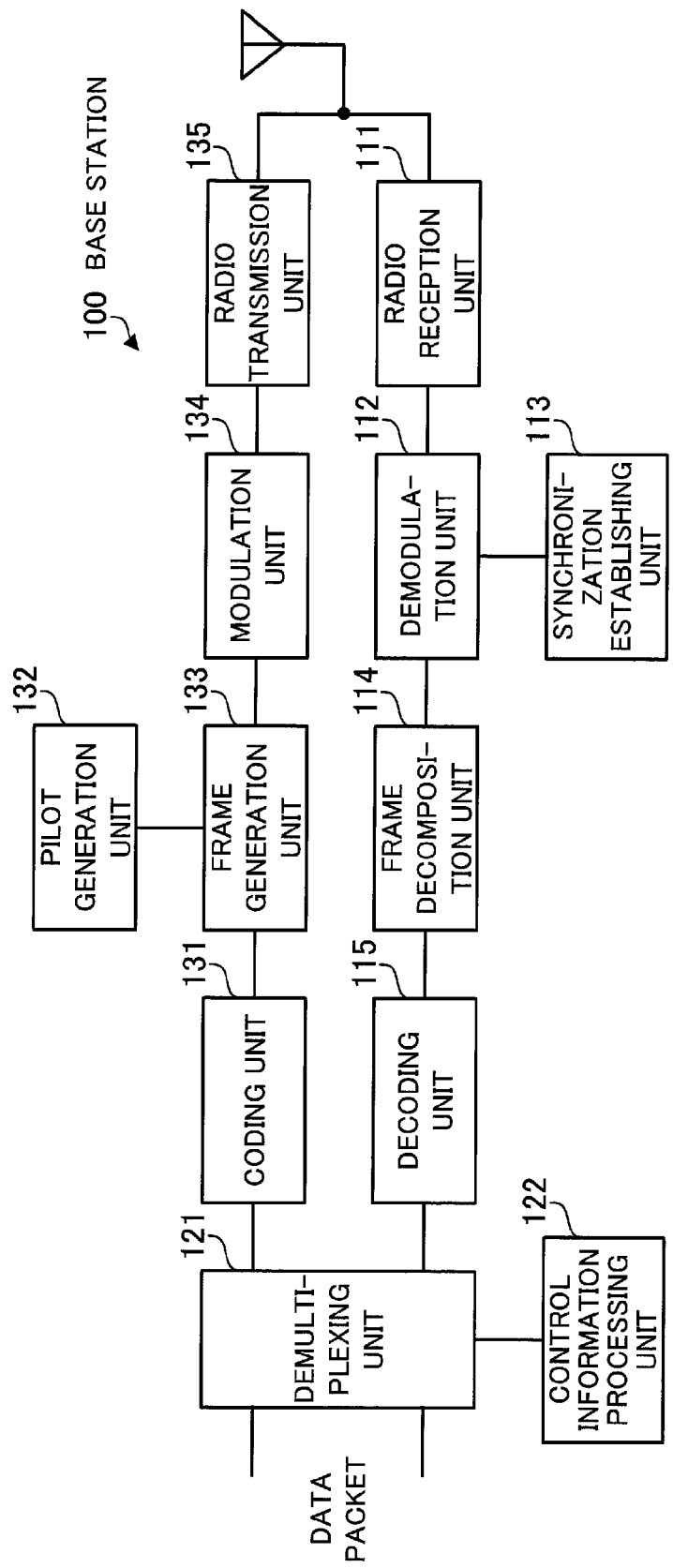
FIG. 5 is a block diagram of a base station according to the second embodiment.

FIG. 5 is a block diagram of a base station according to the second embodiment. The base station 100 includes a radio reception unit 111, a demodulation unit 112, a synchronization establishing unit 113, a frame decomposition unit 114, a decoding unit 115, a demultiplexing unit 121, a control information processing unit 122, a coding unit 131, a pilot generation unit 132, a frame generation unit 133, a modulation unit 134, and a radio transmission unit 135. The base station 100a may be implemented with the same block configuration as that of the base station 100.

The radio reception unit 111 performs radio signal processing on reception signals obtained from an antenna of the base station 100 so as to convert (down-convert) the high-frequency radio signals into low-frequency baseband signals. The radio reception unit 111 includes circuits such as a low noise amplifier (LNA), a quadrature demodulator, and an analog-to-digital converter (ADC), for example. The radio reception unit 111 outputs the obtained baseband signals to the demodulation unit 112.

The demodulation unit 112 performs digital demodulation of the baseband signals obtained from the radio reception unit 111. The demodulation is performed using a scheme corresponding to a predetermined modulation and coding scheme (MCS) or an adaptively selected MCS. Then, the demodulation unit 112 outputs the demodulated baseband signals to the frame decomposition unit 114. Further, the demodulation unit 112 extracts a pilot signal from the demodulated baseband signals, and outputs the pilot signal to the synchronization establishing unit 113.

The synchronization establishing unit 113 detects a timing of receiving uplink radio frames and symbols from the relay station 200 on the basis of the known pilot signal obtained from the demodulation unit 112, and establishes synchronization with the relay station 200. Then, the synchronization establishing unit 113 controls the timing of reception processing of the base station 100.

The frame decomposition unit 114 separates and extracts, from the baseband signals obtained from the demodulation unit 112, baseband signals of the various channels included in the uplink radio frame. Then, the frame decomposition unit 114 outputs the extracted baseband signals of the respective channels to the decoding unit 115.

The decoding unit 115 performs error-correction decoding on the baseband signals of the various channels obtained from the frame decomposition unit 114. The decoding is performed using a scheme corresponding to a predetermined MCS or an adaptively selected MCS. Then, the decoding unit 115 outputs the decoded baseband signals to the demultiplexing unit 121.

The demultiplexing unit 121 separates data and control information that are contained in the baseband signals obtained from the decoding unit 115. The separated data are packetized and output to the wired network. The separated control information is output to the control information processing unit 122. Further, the demultiplexing unit 121 multiplexes the data to be transmitted to the mobile station 300 and the control information obtained from the control information processing unit 122, and outputs the multiplexed result to the coding unit 131.

The control information processing unit 122 obtains the control information of the uplink from the demultiplexing unit 121, and controls communications with the relay station 200. The uplink control information includes a handover request. Upon obtaining the handover request from the relay station 200, the control information processing unit 122 controls a handover for switching the destination of the relay station 200 from the base station 100 to the base station 100a. Further, the control information processing unit 122 generates control information of the downlink, and outputs the downlink control information to the demultiplexing unit 121. The downlink control information includes a handover instruction that instructs the relay station 200 to execute a handover.

The coding unit 131 performs error-correction coding on the baseband signals of the various channels obtained from the demultiplexing unit 121. The coding is performed using a predetermined MCS or an adaptively selected MCS. Then, the coding unit 131 outputs the coded baseband signals to the frame generation unit 133.

The pilot generation unit 132 generates a known pilot signal such as a reference signal, and outputs the generated pilot signal to the frame generation unit 133. Note that the pilot signal transmitted by the base station 100 and the pilot signal transmitted by the base station 100a are different signals.

The frame generation unit 133 maps the baseband signals obtained from the coding unit 131 and the pilot signal obtained from the pilot generation unit 132 to a downlink radio frame. Then, the frame generation unit 133 outputs the baseband signals of the downlink radio frame to the modulation unit 134.

The modulation unit 134 performs digital modulation of the baseband signals obtained from the frame generation unit 133. The coding is performed using a predetermined MCS or an adaptively selected MCS. Then, the modulation unit 134 outputs the modulated baseband signals to the radio transmission unit 135.

The radio transmission unit 135 performs radio signal processing on the baseband signals obtained from the modulation unit 134 so as to convert (up-convert) the low-frequency baseband signals into high-frequency radio signals. The radio transmission unit 135 includes circuits such as a digital-to-analog converter (DAC), a quadrature modulator, and a power amplifier. The radio transmission unit 135 outputs the obtained transmission signals to the antenna of the base station 100.

Figure 6:
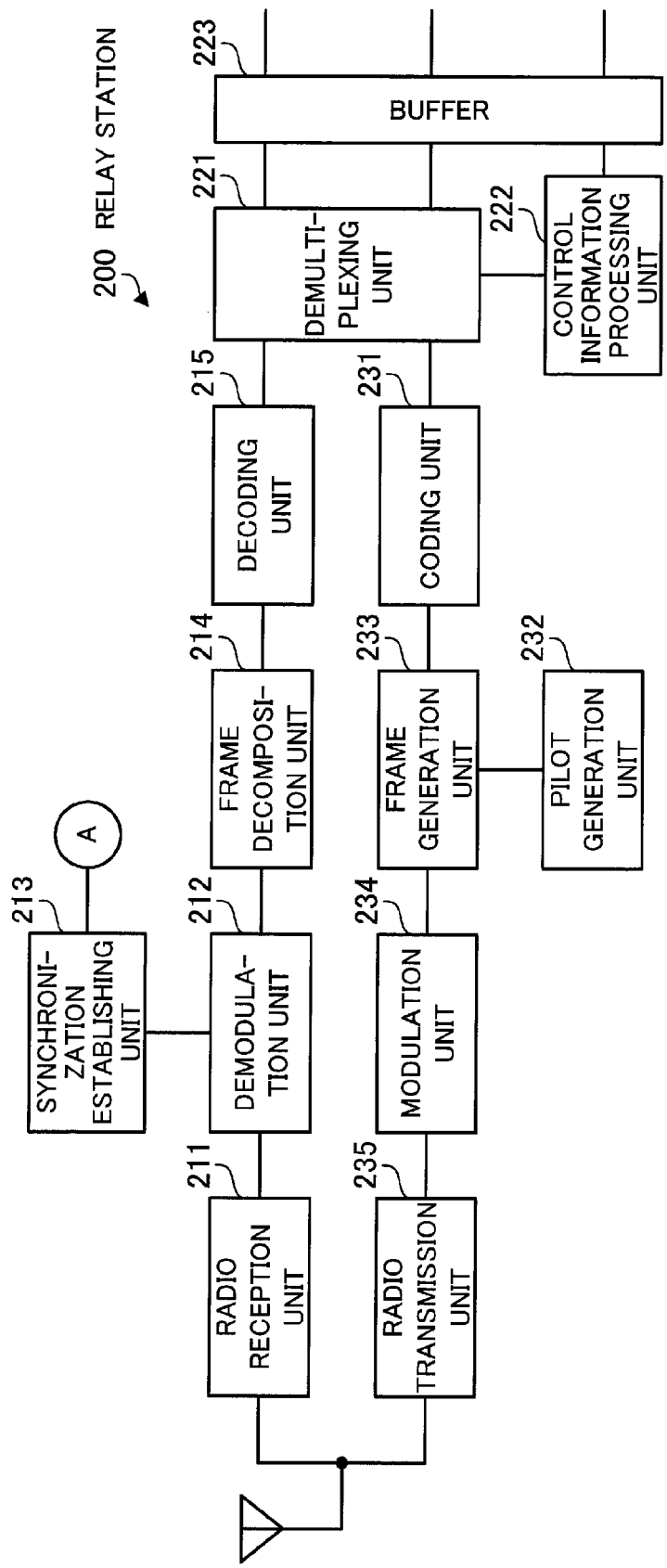
FIG. 6 is a block diagram of a relay station according to the second embodiment.

FIG. 6 is a block diagram of a relay station according to the second embodiment. FIG. 6 illustrates the block structure of the base stations 100 and 100a side. The relay station 200 includes a radio reception unit 211, a demodulation unit 212, a synchronization establishing unit 213, a frame decomposition unit 214, a decoding unit 215, a demultiplexing unit 221, a control information processing unit 222, a buffer 223, a coding unit 231, a pilot generation unit 232, a frame generation unit 233, a modulation unit 234, and a radio transmission unit 235. Note that the synchronization establishing unit 213 may be considered as an example of the synchronization unit 21 of the first embodiment.

The radio reception unit 211 down-converts high-frequency radio signals obtained from an antenna of the relay station 200 into low-frequency baseband signals, and outputs the baseband signals to the demodulation unit 212.

The demodulation unit 212 performs digital demodulation of the baseband signals obtained from the radio reception unit 211, and outputs the demodulated baseband signals to the frame decomposition unit 214. Further, the demodulation unit 212 extracts a pilot signal from the demodulated baseband signals, and outputs the pilot signal to the synchronization establishing unit 213.

The synchronization establishing unit 213 detects a timing of receiving downlink radio frames and symbols from the base station 100 or 100a on the basis of the known pilot signal obtained from the demodulation unit 212, and establishes synchronization with the base station 100 or 100a. Then, the synchronization establishing unit 213 controls the timing of reception processing of the relay station 200. Further, the synchronization establishing unit 213 performs cell search. That is, the synchronization establishing unit 213 measures the received power level of each cell on the basis of pilot signals, and detects a candidate destination base station.

Further, when the relay station 200 performs a handover, the synchronization establishing unit 213 calculates the difference in reception timing between the handover source base station 100 and the handover destination base station 100a in advance. Note that the reception timing of the handover destination base station is already detected by cell search before execution of the handover. Accordingly, the synchronization establishing unit 213 may prepare for synchronization with (may tentatively establish synchronization with) the handover destination base station, before the handover.

The frame decomposition unit 214 separates and extracts, from the baseband signals obtained from the demodulation unit 212, baseband signals of the various channels included in the downlink radio frame. Then, the frame decomposition unit 214 outputs the extracted baseband signals of the respective channels to the decoding unit 215.

The decoding unit 215 performs error-correction decoding on the baseband signals of the various channels obtained from the frame decomposition unit 214, and outputs the decoded baseband signals to the demultiplexing unit 221.

The demultiplexing unit 221 separates data and control information that are contained in the baseband signals obtained from the decoding unit 215. The separated data of the downlink are stored in the buffer 223. The separated control information of the downlink is output to the control information processing unit 222. Further, the demultiplexing unit 221 multiplexes uplink data stored in the buffer 223 and control information of the uplink obtained from the control information processing unit 222, and outputs the multiplexed result to the coding unit 231.

The control information processing unit 222 obtains the downlink control information from the demultiplexing unit 221, and controls communications with the base stations 100 and 100a. The downlink control information includes a handover instruction. Upon obtaining the handover instruction, the control information processing unit 222 switches the destination of the relay station 200 from the base station 100 to the base station 100a. Further, the control information processing unit 222 stores control information for controlling communications with the mobile station 300 in the buffer 223. Furthermore, the control information processing unit 222 generates control information of the uplink, and outputs the uplink control information to the demultiplexing unit 221. The uplink control information includes a handover request.

The coding unit 231 performs error-correction coding on the baseband signals of the various channels obtained from the demultiplexing unit 221, and outputs the coded baseband signals to the frame generation unit 233.

The pilot generation unit 232 generates a known pilot signal, and outputs the generated pilot signal to the frame generation unit 233.

The frame generation unit 233 maps the baseband signals obtained from the coding unit 231 and the pilot signal obtained from the pilot generation unit 232 to an uplink radio frame, and outputs the baseband signals of the uplink radio frame to the modulation unit 234.

The modulation unit 234 performs digital modulation of the baseband signals obtained from the frame generation unit 233, and outputs the modulated baseband signals to the radio transmission unit 235.

The radio transmission unit 235 up-converts the low-frequency baseband signals obtained from the modulation unit 234 into high-frequency radio signals, and outputs the radio signals to the antenna of the relay station 200.

Figure 7:
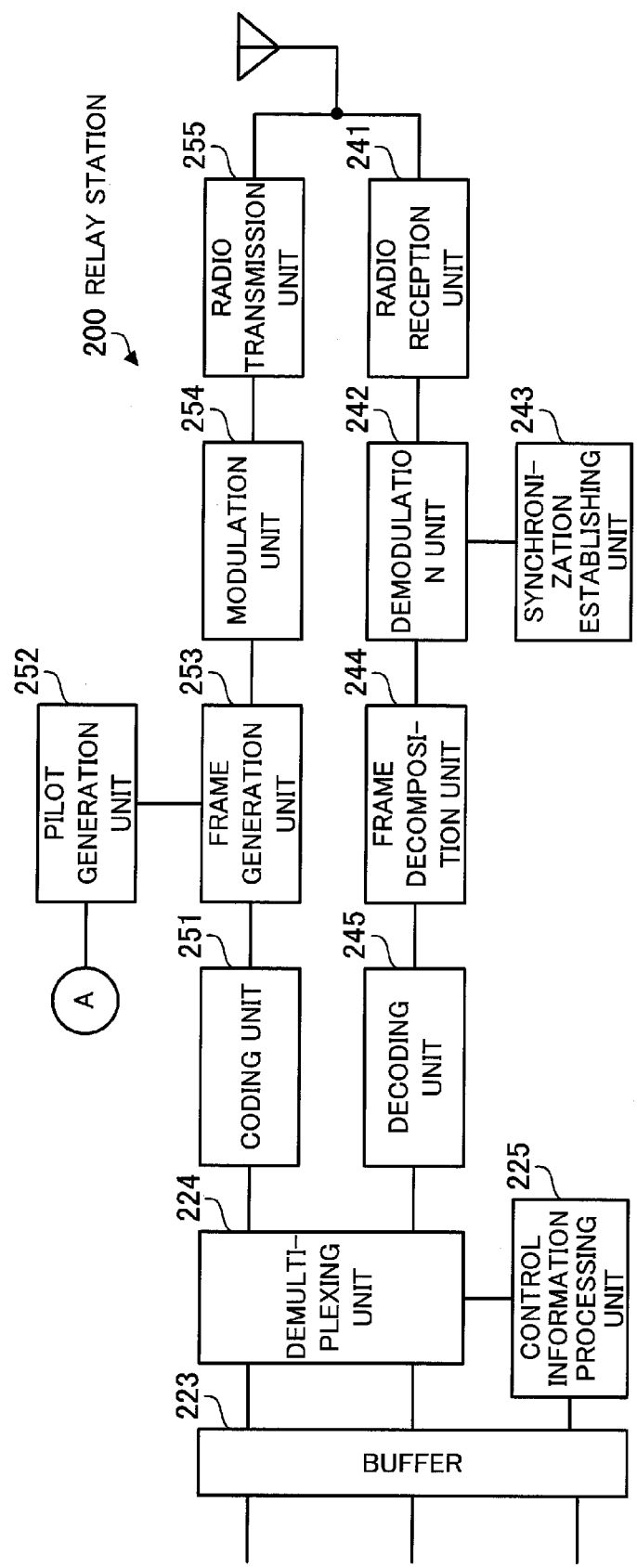
FIG. 7 is a block diagram (cont'd) of the relay station according to the second embodiment.

FIG. 7 is a block diagram (cont'd) of the relay station according to the second embodiment. FIG. 7 illustrates the block structure of the mobile station 300 side. The relay station 200 further includes a demultiplexing unit 224, a control information processing unit 225, a radio reception unit 241, a demodulation unit 242, a synchronization establishing unit 243, a frame decomposition unit 244, a decoding unit 245, a coding unit 251, a pilot generation unit 252, a frame generation unit 253, a modulation unit 254, and a radio transmission unit 255. Note that a group including the pilot generation unit 252, the frame generation unit 253, the modulation unit 254, and the radio transmission unit 255 may be considered as an example of the transmission unit 22 of the first embodiment.

The demultiplexing unit 224 separates data and control information that are contained in the baseband signals obtained from the decoding unit 245. The separated data of the uplink are stored in the buffer 223. The separated control information of the uplink is output to the control information processing unit 225. Further, the demultiplexing unit 224 multiplexes downlink data stored in the buffer 223 and control information of the downlink obtained from the control information processing unit 225, and outputs the multiplexed result to the coding unit 251.

The control information processing unit 225 obtains the uplink control information from the demultiplexing unit 224, and obtains the downlink control information from the control information processing unit 222 via the buffer 223. Thus, the control information processing unit 225 controls communications with the mobile station 300. Further, the control information processing unit 225 generates control information of the downlink to be transmitted to the mobile station 300, and outputs the downlink control information to the demultiplexing unit 224.

The radio reception unit 241 down-converts high-frequency radio signals obtained from an antenna of the relay station 200 into low-frequency baseband signals, and outputs the baseband signals to the demodulation unit 242.

The demodulation unit 242 performs digital demodulation of the baseband signals obtained from the radio reception unit 241, and outputs the demodulated baseband signals to the frame decomposition unit 244. Further, the demodulation unit 242 extracts a pilot signal from the demodulated baseband signals, and outputs the pilot signal to the synchronization establishing unit 243.

The synchronization establishing unit 243 detects a timing of receiving uplink radio frames and symbols from the mobile station 300 on the basis of the pilot signal obtained from the demodulation unit 242, and establishes synchronization with the mobile station 300. Then, the synchronization establishing unit 243 controls the timing of reception processing of the relay station 200.

The frame decomposition unit 244 separates and extracts, from the baseband signals obtained from the demodulation unit 242, baseband signals of the various channels included in the uplink radio frame. Then, the frame decomposition unit 244 outputs the extracted baseband signals of the respective channels to the decoding unit 245.

The decoding unit 245 performs error-correction decoding on the baseband signals of the various channels obtained from the frame decomposition unit 244, and outputs the decoded baseband signals to the demultiplexing unit 224.

The coding unit 251 performs error-correction coding on the baseband signals of the various channels obtained from the demultiplexing unit 224, and outputs the coded baseband signals to the frame generation unit 253.

The pilot generation unit 252 generates a known pilot signal such as a reference signal, and outputs the generated pilot signal to the frame generation unit 253 at a timing corresponding to the current synchronization status of the base stations 100 and 100a side. Further, before the relay station 200 performs a handover, the pilot generation unit 252 obtains timing difference information indicating the difference in reception timing between the base station 100 and the base station 100a from the synchronization establishing unit 213. Then, the pilot generation unit 252 also outputs a pilot signal at a timing shifted from the normal output timing by the amount of time indicated by the timing difference information.

Note that the pilot signal transmitted by the relay station 200 is different from the pilot signals transmitted by the base stations 100 and 100a. The pilot signal transmitted by the relay station 200 before the handover and the pilot signal transmitted after the handover are the same. However, the pilot signal transmitted by the relay station 200 before the handover and the pilot signal transmitted after the handover may be different from each other. In this case, immediately before the handover, two types of pilot signals are transmitted.

The frame generation unit 253 maps the baseband signals obtained from the coding unit 251 and the pilot signal obtained from the pilot generation unit 252 to a downlink radio frame, and outputs the baseband signals of the downlink radio frame to the modulation unit 254.

The modulation unit 254 performs digital modulation of the baseband signals obtained from the frame generation unit 253, and outputs the modulated baseband signals to the radio transmission unit 255.

The radio transmission unit 255 up-converts the low-frequency baseband signals obtained from the modulation unit 254 into high-frequency radio signals, and outputs the radio signals to the antenna of the relay station 200.

Figure 8:
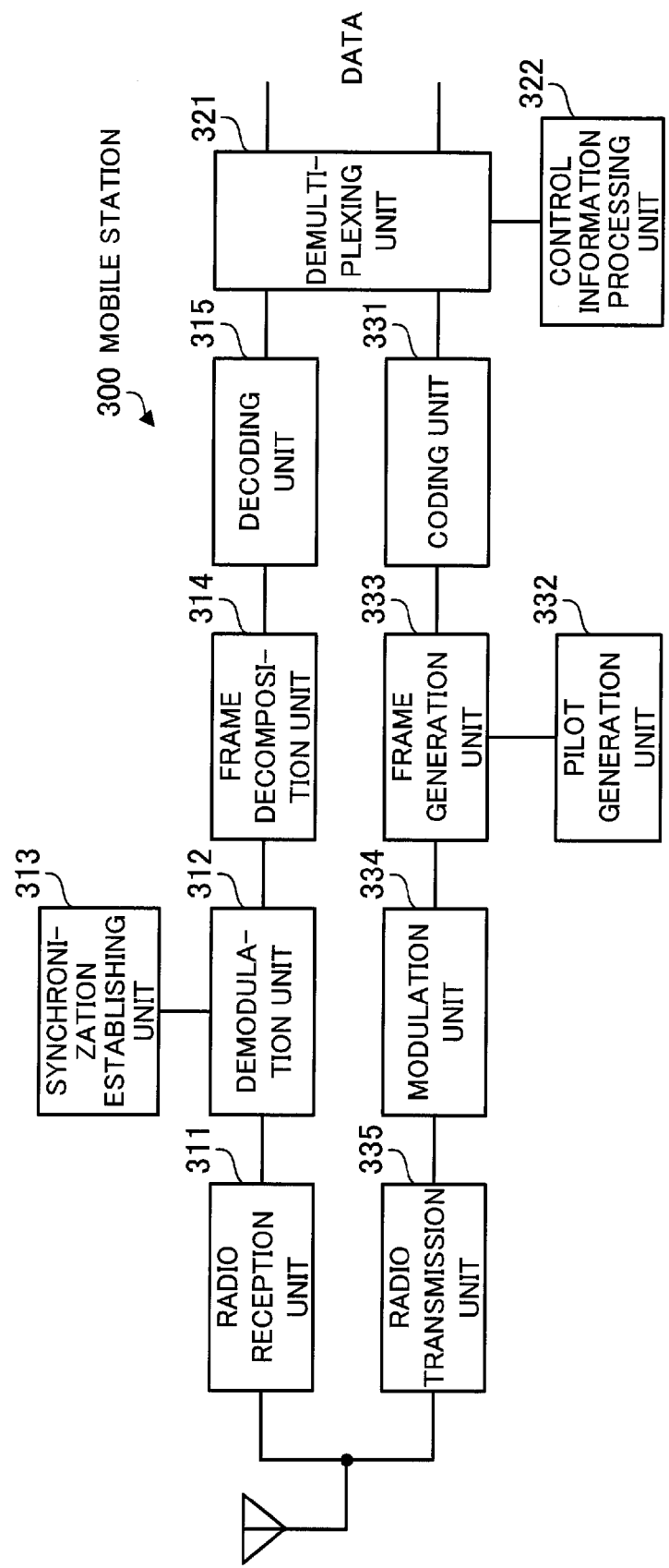
FIG. 8 is a block diagram of a mobile station according to the second embodiment.

FIG. 8 is a block diagram of the mobile station according to the second embodiment. The mobile station 300 includes a radio reception unit 311, a demodulation unit 312, a synchronization establishing unit 313, a frame decomposition unit 314, a decoding unit 315, a demultiplexing unit 321, a control information processing unit 322, a coding unit 331, a pilot generation unit 332, a frame generation unit 333, a modulation unit 334, and a radio transmission unit 335. Note that a group including the radio reception unit 311 and the demodulation unit 312 may be considered as an example of the reception unit 31 of the first embodiment. Further, the synchronization establishing unit 313 may be considered as an example of the synchronization unit 32.

The radio reception unit 311 down-converts high-frequency radio signals obtained from an antenna of the mobile station 300 into low-frequency baseband signals, and outputs the baseband signals to the demodulation unit 312.

The demodulation unit 312 performs digital demodulation of the baseband signals obtained from the radio reception unit 311, and outputs the demodulated baseband signals to the frame decomposition unit 314. Further, the demodulation unit 312 extracts a pilot signal from the demodulated baseband signals, and outputs the pilot signal to the synchronization establishing unit 313.

The synchronization establishing unit 313 detects a timing of receiving downlink radio frames and symbols from the relay station 200 on the basis of the pilot signal obtained from the demodulation unit 312, and establishes synchronization with the relay station 200. Then, the synchronization establishing unit 313 controls the timing of reception processing of the mobile station 300. Further, the synchronization establishing unit 313 performs cell search. That is, the synchronization establishing unit 313 measures the received power level of each cell on the basis of pilot signals, and detects a candidate relay station (or base station).

Further, before the relay station 200 performs a handover, the synchronization establishing unit 313 detects the other pilot signal received from the relay station 200 at a timing different from that of the normal pilot signal. Then, the synchronization establishing unit 313 prepares to synchronize with the relay station 200 after execution of a handover, on the basis of the detected other pilot signal, and quickly establishes synchronization after the handover.

The frame decomposition unit 314 separates and extracts, from the baseband signals obtained from the demodulation unit 312, baseband signals of the various channels included in the downlink radio frame. Then, the frame decomposition unit 314 outputs the extracted baseband signals of the respective channels to the decoding unit 315.

The decoding unit 315 performs error-correction decoding on the baseband signals of the various channels obtained from the frame decomposition unit 314, and outputs the decoded baseband signals to the demultiplexing unit 321.

The demultiplexing unit 321 separates data and control information that are contained in the baseband signals obtained from the decoding unit 315. The separated data of the downlink are transmitted to a data processing unit (not illustrated) of an upper layer. The separated control information of the downlink is output to the control information processing unit 322. Further, the demultiplexing unit 321 multiplexes uplink data and uplink control information that is obtained from the control information processing unit 322, and outputs the multiplexed result to the coding unit 331.

The control information processing unit 322 obtains the downlink control information from the demultiplexing unit 321, and controls communications with the relay station 200. Furthermore, the control information processing unit 322 generates control information of the uplink, and outputs the uplink control information to the demultiplexing unit 321.

The coding unit 331 performs error-correction coding on the baseband signals of the various channels obtained from the demultiplexing unit 321, and outputs the coded baseband signals to the frame generation unit 333.

The pilot generation unit 332 generates a known pilot signal, and outputs the generated pilot signal to the frame generation unit 333.

The frame generation unit 333 maps the baseband signals obtained from the coding unit 331 and the pilot signal obtained from the pilot generation unit 332 to an uplink radio frame, and outputs the baseband signals of the uplink radio frame to the modulation unit 334.

The modulation unit 334 performs digital modulation of the baseband signals obtained from the frame generation unit 333, and outputs the modulated baseband signals to the radio transmission unit 335.

The radio transmission unit 335 up-converts the low-frequency baseband signals obtained from the modulation unit 334 into high-frequency radio signals, and outputs the radio signals to the antenna of the mobile station 300.

Figure 9:
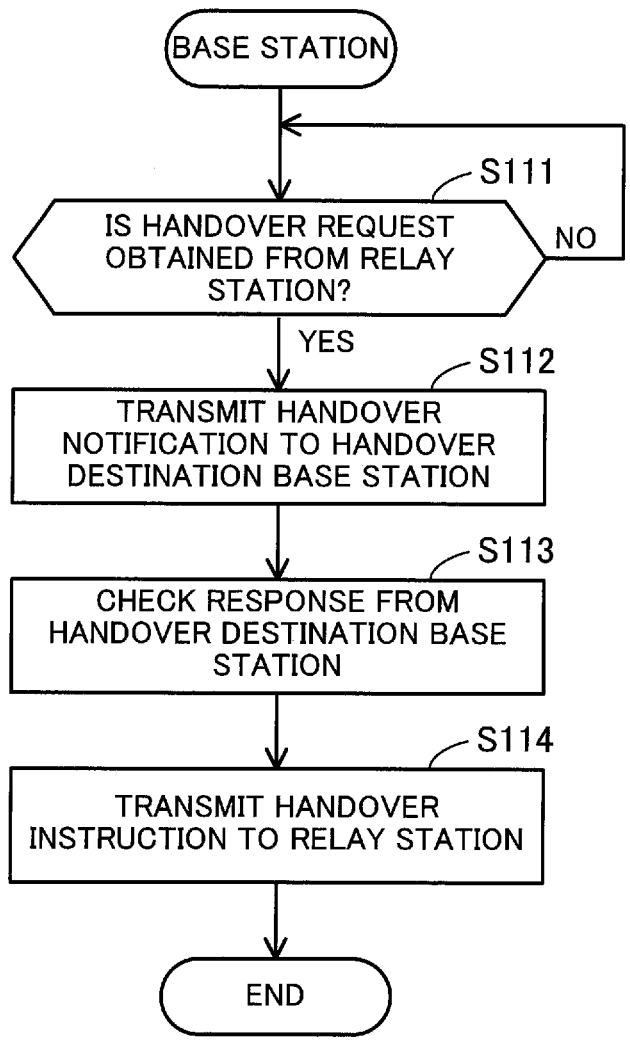
FIG. 9 is a flowchart illustrating operations of the base station according to the second embodiment.

FIG. 9 is a flowchart illustrating operations of the base station according to the second embodiment. More specifically, FIG. 9 illustrates operations performed by the handover source base station 100. In the following, the operations illustrated in FIG. 9 are described in order of step number.

(Step S111) The control information processing unit 122 determines whether a handover request is obtained from the relay station 200. If a handover request is obtained, the process proceeds to step S112. If not, the operation of step S111 is repeated.

(Step S112) The control information processing unit 122 transmits a handover notification indicating that the base station 100a is selected as the handover destination of the relay station 200, to the handover destination base station 100a over the wired network.

(Step S113) The control information processing unit 122 obtains from the base station 100a a handover response indicating that the relay station 200 is acceptable.

(Step S114) The control information processing unit 122 generates, as Layer 3 control information, a handover instruction that instructs execution of a handover. The radio transmission unit 135 transmits the handover instruction to the relay station 200.

Figure 10:
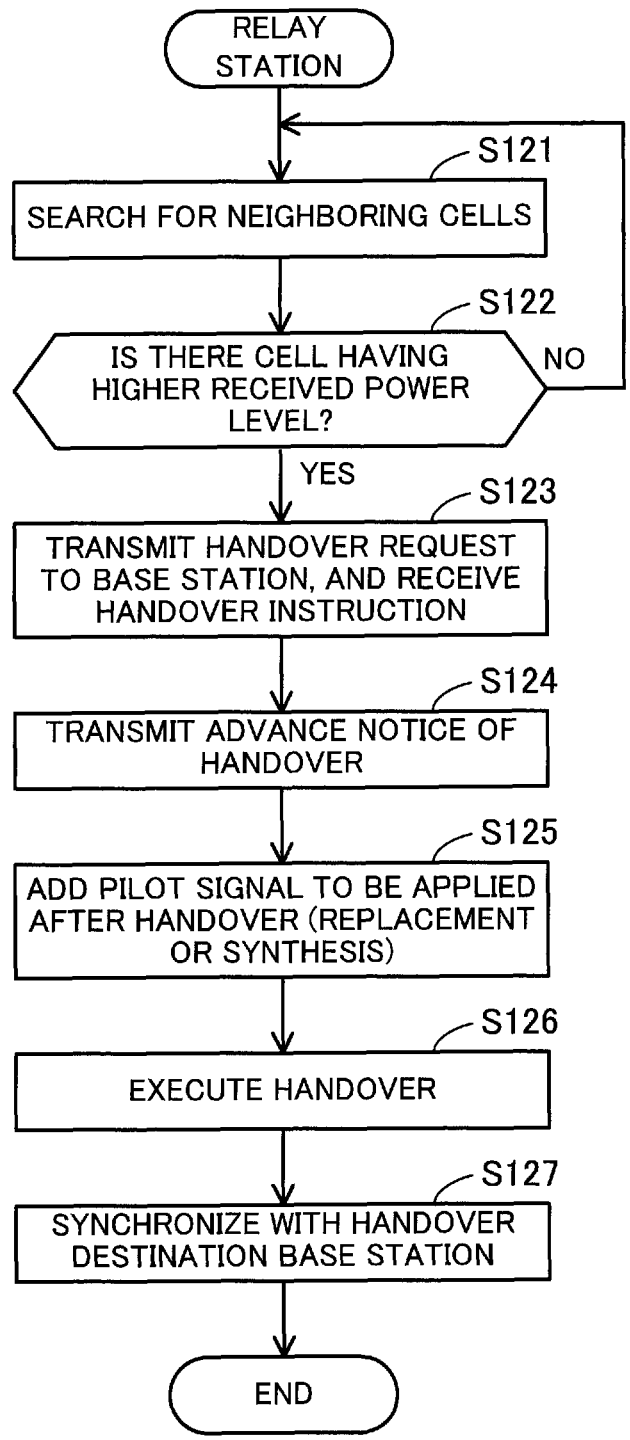
FIG. 10 is a flowchart illustrating operations of the relay station according to the second embodiment.

FIG. 10 is a flowchart illustrating operations of the relay station according to the second embodiment. More specifically, FIG. 10 illustrates the case where the relay station 200 performs a handover from the base station 100 to the base station 100a. In the following, the operations illustrated in FIG. 10 are described in order of step number.

(Step S121) The synchronization establishing unit 213 measures received power levels of neighboring cells on the basis of pilot signals received from the base stations 100 and 100a.

(Step S122) The control information processing unit 222 determines whether there is a cell having a higher received power level than the cell of the base station 100, on the basis of the measurement result of step S121. If there is a cell having a higher received power level, the process proceeds to step S123. If not, the process proceeds to step S121.

(Step S123) The control information processing unit 222 generates a handover request. The radio transmission unit 235 transmits the handover request to the base station 100. The radio reception unit 211 receives a handover instruction from the base station 100.

(Step S124) The control information processing unit 225 detects that a handover is to be executed, and generates an advance notice of handover as Layer 3 control information. The radio transmission unit 255 transmits the advance notice of handover to the mobile station 300.

(Step S125) The pilot generation unit 252 outputs a pilot signal at a timing corresponding to the base station 100a, in addition to a timing corresponding to the base station 100. The timing of receiving frames and symbols from the base station 100a is already detected in step S121. The frame generation unit 253 maps two sets of pilot signals having different timings to a downlink radio frame.

In the case where data signals are allocated to the radio resource to be used for transmission of the pilot signal corresponding to the base station 100*a*, the frame generation unit 253 performs signal replacement or synthesis. In the former case, the data signal is replaced with the pilot signal. In the latter case, the pilot signal is added to the data signal. When signal replacement or synthesis is performed, part of the data signal is lost. However, since the data signal is error correction coded, even if a pilot signal is superimposed, the mobile station 300 performs error-correction decoding so as to prevent a reduction in transmission quality.

(Step S126) The control information processing unit 222 executes a handover for switching the destination from the base station 100 to the base station 100*a*.

(Step S127) The synchronization establishing unit 213 establishes synchronization with the base station 100*a*, on the basis of the reception timing detected in step S121.

Figure 11:
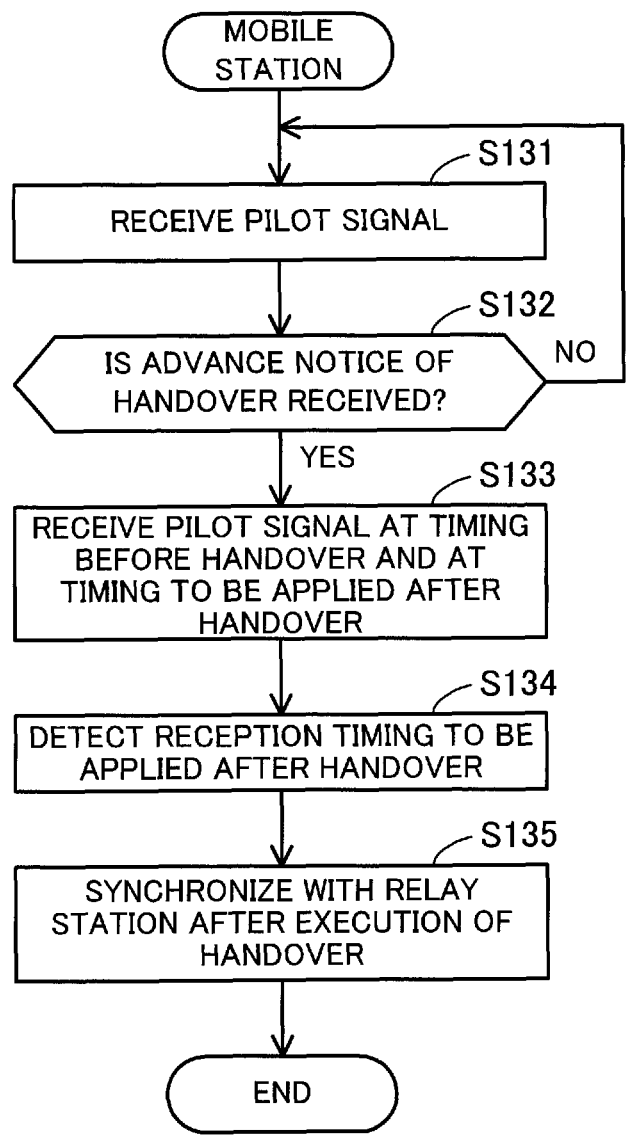
FIG. 11 is a flowchart illustrating operations of the mobile station according to the second embodiment.

FIG. 11 is a flowchart illustrating operations of the mobile station according to the second embodiment. In the following, the operations illustrated in FIG. 11 are described in order of step number.

(Step S131) The radio reception unit 311 receives a pilot signal from the relay station 200. The synchronization establishing unit 313 maintains synchronization with the relay station 200, on the basis of the reception timing of a normal pilot signal (a pilot signal corresponding to the base station 100).

(Step S132) The control information processing unit 322 determines whether an advance notice of handover is received from the relay station 200. If an advance notice of handover is received, the process proceeds to step S133. If not, the process proceeds to step S131.

(Step S133) The radio reception unit 311 receives radio signals from the relay station 200. The synchronization establishing unit 313 searches for another pilot signal (a pilot signal corresponding to the base station 100*a*) that is received at a timing different from that of the normal pilot signal (the pilot signal corresponding to the base station 100).

(Step S134) The synchronization establishing unit 313 detects a reception timing of frames and symbols to be applied after a handover is executed by the relay station 200, on the basis of the other pilot signal detected in step S133.

(Step S135) After execution of a handover by the relay station 200, the synchronization establishing unit 313 establishes synchronization with the relay station 200, on the basis of the reception timing detected in step S134.

Figure 12:
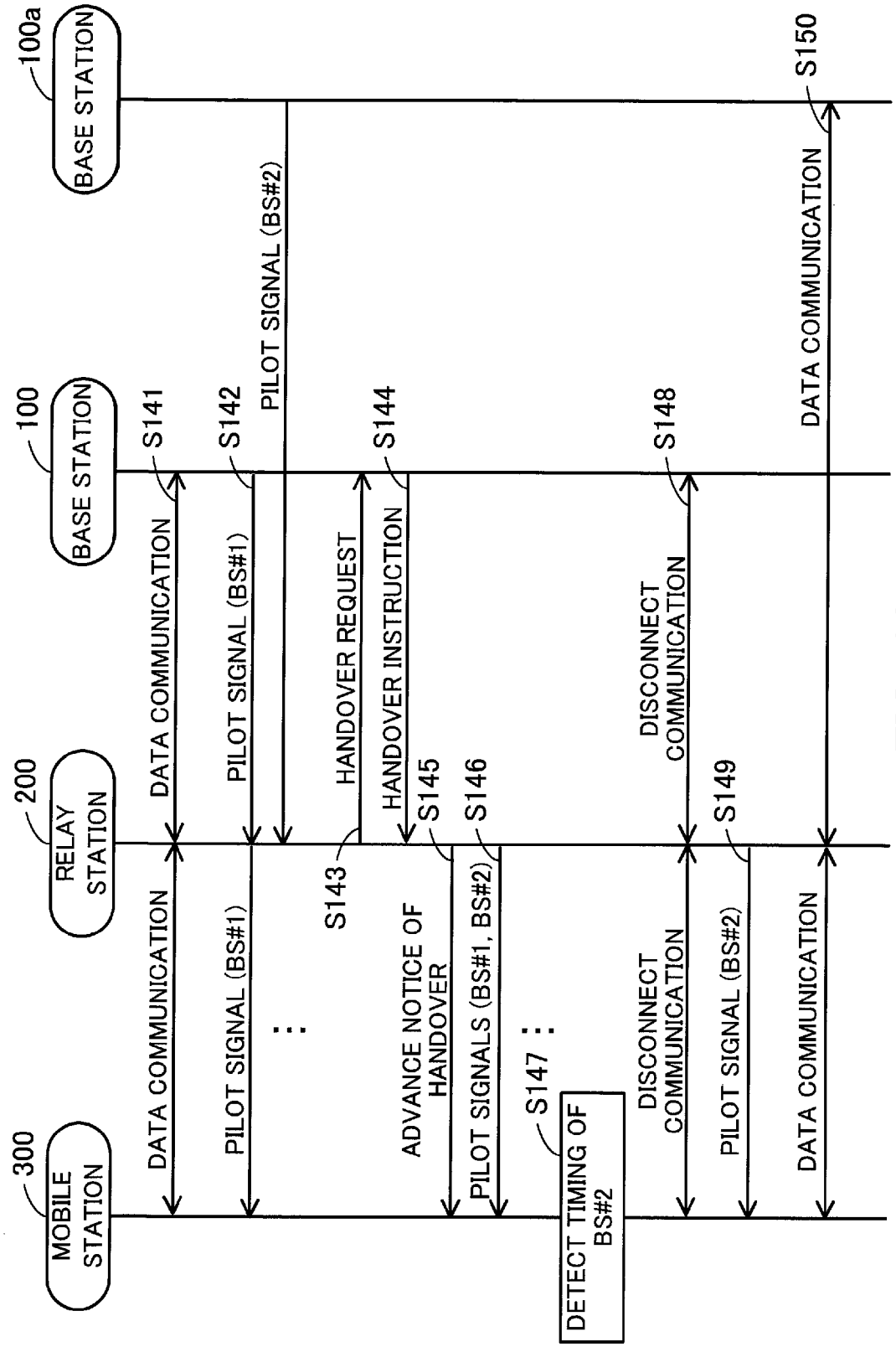
FIG. 12 illustrates a sequence diagram illustrating the flow of handover control according to the second embodiment.

FIG. 12 illustrates a sequence diagram illustrating the flow of handover control according to the second embodiment. In the following, operations of FIG. 12 are described in order of step number.

(Step S141) The relay station 200 connects to and synchronizes with the base station 100. The mobile station 300 performs data communication with the base station 100 via the relay station 200.

(Step S142) The base stations 100 and 100*a* transmit pilot signals thereof. The relay station 200 receives the pilot signal of the base station 100, and transmits a pilot signal at a timing corresponding to the base station 100. Further, the relay station 200 receives the pilot signals of the base stations 100 and 100*a*, and measures the received power levels.

(Step S143) The relay station 200 detects that the received power level of the cell of the base station 100*a* is higher than that of the cell of the base station 100, and transmits a handover request to the base station 100.

(Step S144) The base station 100 confirms that a handover to the base station 100*a* is executable, and transmits a handover instruction to the relay station 200.

(Step S145) The relay station 200 transmits an advance notice of handover to the mobile station 300.

(Step S146) During the period from reception of the handover instruction to execution of a handover, the relay station 200 transmits both the pilot signal having the timing corresponding to the base station 100 and the pilot signal having the timing corresponding to the base station 100*a*.

(Step S147) The mobile station 300 receives the pilot signal having the timing corresponding to the base station 100*a* from the relay station 200, and detects a reception timing to be applied after a handover.

(Step S148) The relay station 200 performs a handover for switching the destination from the base station 100 to the base station 100*a*. That is, the communication between the base station 100 and the relay station 200 is disconnected. Further, the relay station 200 and the mobile station 300 temporarily become out of synchronization with each other.

(Step S149) The relay station 200 transmits a pilot signal at a timing corresponding to the base station 100*a*. When the mobile station 300 becomes out of synchronization with the relay station 200, the mobile station 300 attempts to receive a pilot signal at the reception timing detected in step S147, and re-establishes synchronization.

(Step S150) The mobile station 300 starts data communication with the base station 100*a* via the relay station 200 after execution of the handover.

In the above description, the relay station 200 transmits an advance notice of handover to the mobile station 300 before executing a handover. However, the relay station 200 does not need to transmit an advance notice of handover to the mobile station 300. In this case, the mobile station 300 autonomously performs search to determine whether another pilot signal is transmitted.

Figure 13:
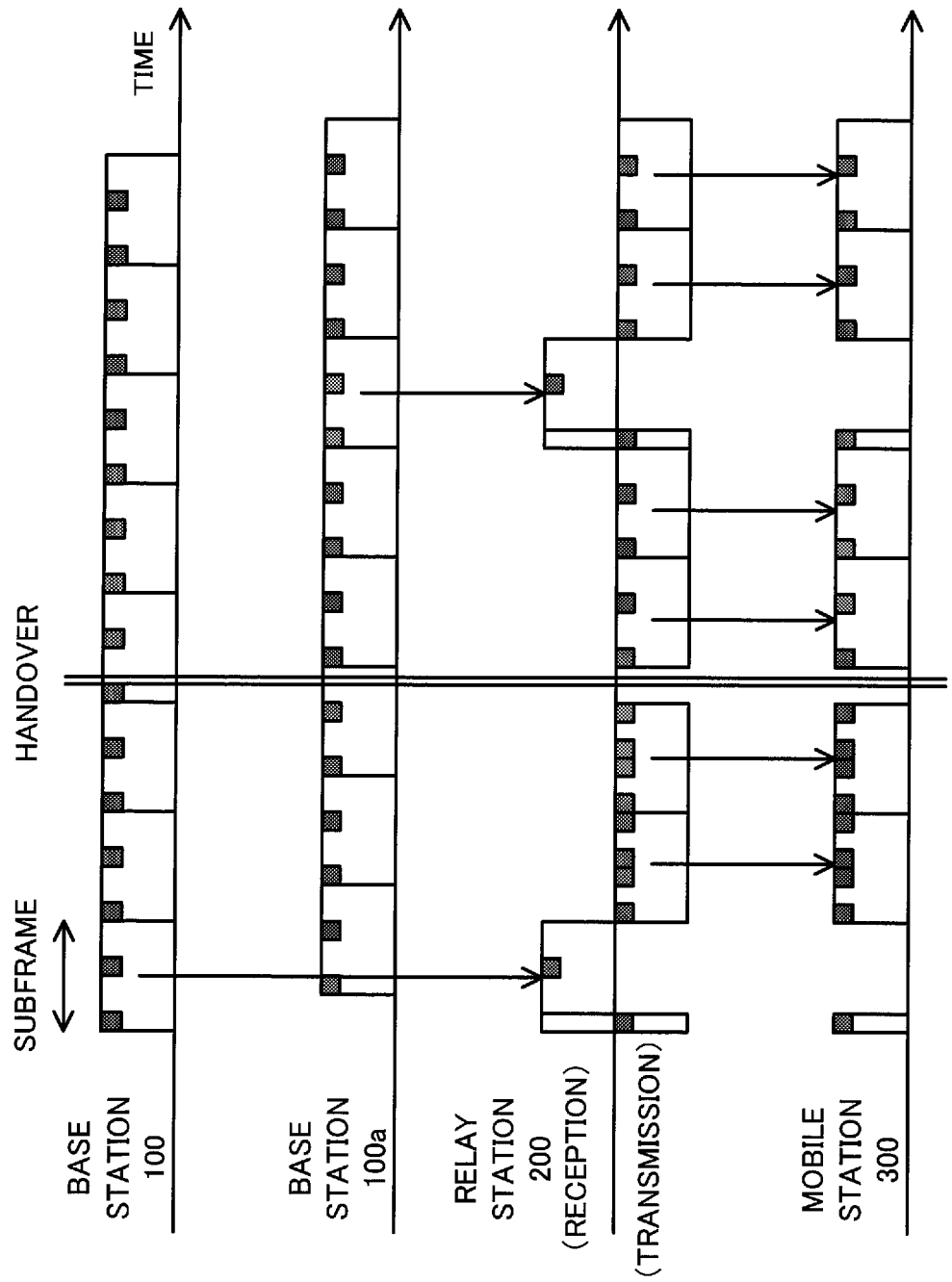
FIG. 13 illustrates an example of reception of pilot signals according to the second embodiment.

FIG. 13 illustrates an example of reception of pilot signals according to the second embodiment. When the relay station 200 is connected to the base station 100, the relay station 200 synchronizes with the base station 100. Thus, the relay station 200 receives a pilot signal in a predetermined subframe from the base station 100, and transmits a pilot signal in another subframe to the mobile station 300. Further, when the relay station 200 is connected to the base station 100*a*, the relay station 200 synchronizes with the base station 100*a*. Thus, the relay station 200 receives a pilot signal in a predetermined subframe from the base station 100*a*, and transmits a pilot signal in another subframe to the mobile station 300.

Before executing a handover for switching the destination from the base station 100 to the base station 100*a*, the relay station 200 transmits two sets of pilot signal (pilot signals corresponding to the base stations 100 and 100*a*, respectively) in a subframe transmittable to the mobile station 300. The mobile station 300 detects the pilot signal corresponding to the base station 100*a*, and prepares for synchronization. Then, when the handover is executed by the relay station 200, the mobile station 300 switches the reception timing on the basis of the pilot signal detected before the handover. Thus, the mobile station 300 may quickly establish synchronization with the relay station 200 after the handover.

In the above-described mobile communication system of the second embodiment, even when the relay station 200 performs a handover, it is possible to prevent the mobile station 300 that performs data communication through connection to the relay station 200 from being affected by the handover. That is, before a handover by the relay station 200, the mobile station 300 may receive a pilot signal corresponding to the base station 100*a*, and may identify a reception timing to be applied after the handover. Therefore, even if the mobile station 300 misses a pilot signal due to a handover, the mobile station 300 may quickly capture a pilot signal that is transmitted at a new timing so as to establish synchronization. Thus, it is possible to prevent operations such as cell search from occurring, and reduce the time lag taken by the mobile station to resume data communication.

Third Embodiment

Next, a description will be given of a third embodiment. The following mainly describes the differences from the second embodiment, and description of the same features as those of the second embodiment will be omitted. A mobile communication system of the third embodiment is different from that of the second embodiment in the method used by a mobile station to calculate a reception timing to be applied after a handover.

The base station of the third embodiment may be implemented with the same block configuration as that of the base station 100 of the second embodiment illustrated in FIG. 5. Further, the mobile station of the third embodiment may be implemented with the same block configuration as that of the mobile station 300 of the second embodiment illustrated in FIG. 8. As for the base station and the mobile station, the same reference numerals as those of the second embodiment are used in the following description.

Figure 14:
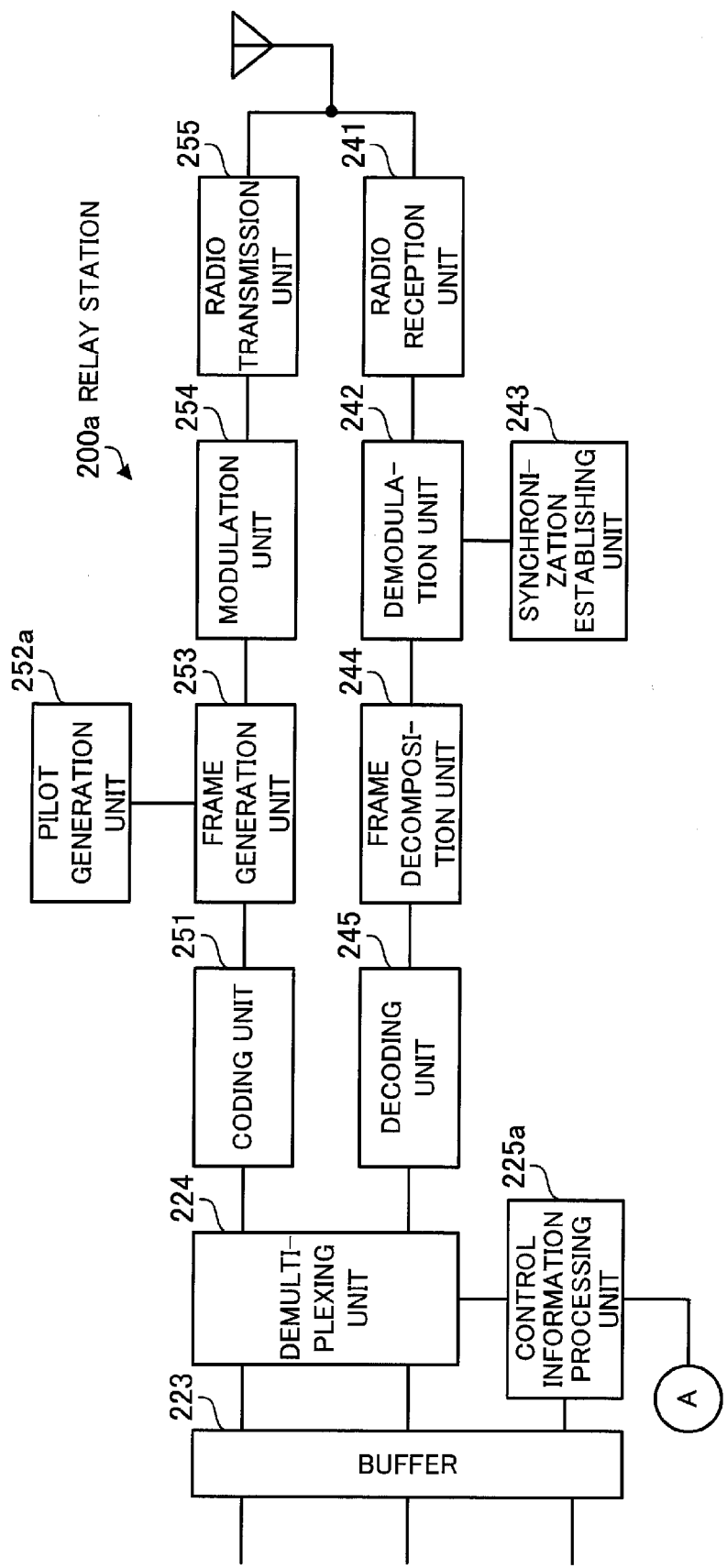
FIG. 14 is a block diagram illustrating (part of) a relay station according to a third embodiment.

FIG. 14 is a block diagram illustrating (part of) a relay station according to the third embodiment. A relay station 200a of the third embodiment includes a control information processing unit 225a and a pilot generation unit 252a, in place of the control information processing unit 225 and the pilot generation unit 252 of the relay station 200. The block configuration of the base stations 100 and 100a side is the same as that of the relay station 200. Note that a group including the control information processing unit 225a, a coding unit 251, a frame generation unit 253, a modulation unit 254, and a radio transmission unit 255 may be considered as an example of the transmission unit 22 of the first embodiment.

The control information processing unit 225a generates timing difference information as Layer 3 control information, before the relay station 200a executes a handover from the base station 100 to the base station 100a. The timing difference information indicates the difference in reception timing between the base station 100 and the base station 100a detected by the synchronization establishing unit 213. The control information processing unit 225a outputs the generated timing difference information to the demultiplexing unit 224.

The pilot generation unit 252a generates a pilot signal, and outputs the generated pilot signal to the frame generation unit 253 at a timing corresponding to the synchronization status of the base stations 100 and 100a side. That is, when the relay station 200a is connected to the base station 100, the pilot generation unit 252a outputs a pilot signal at a timing corresponding to the base station 100. Further, when the relay station 200a is connected to the base station 100a, the pilot generation unit 252a outputs a pilot signal at a timing corresponding to the base station 100a.

Figure 15:
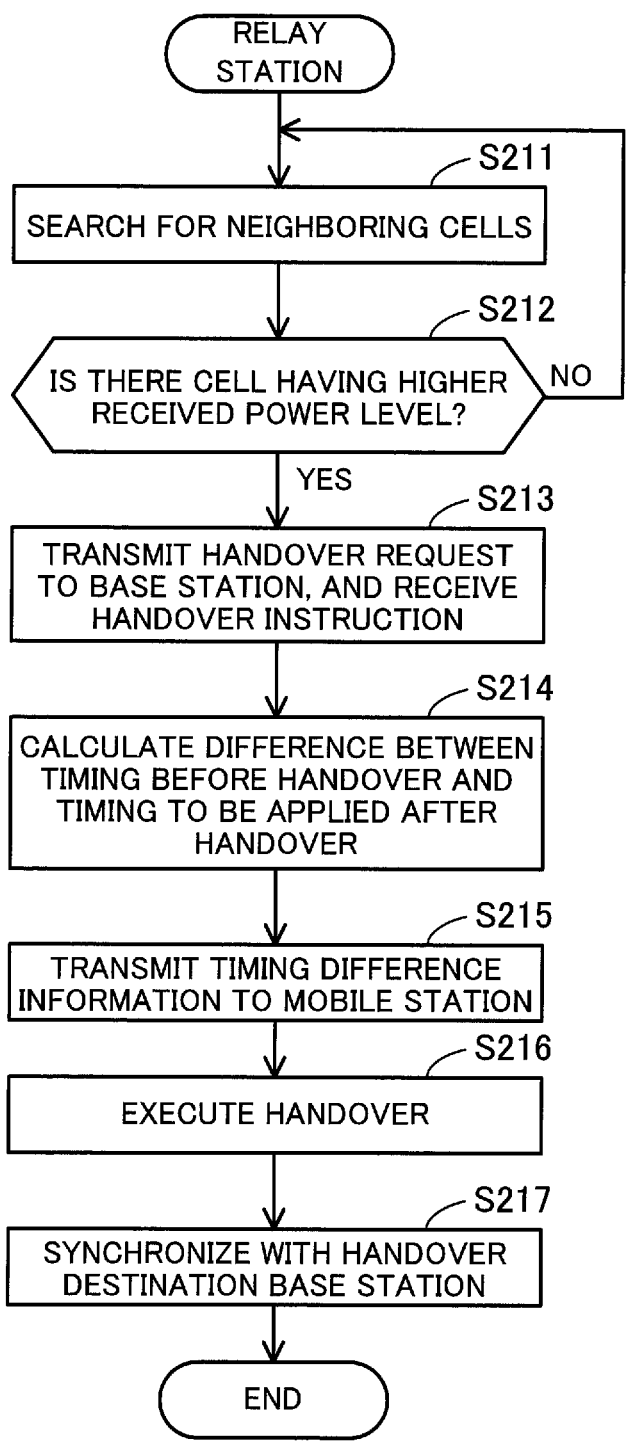
FIG. 15 is a flowchart illustrating operations of the relay station according to the third embodiment.

FIG. 15 is a flowchart illustrating operations of the relay station according to the third embodiment. In the following, the operations illustrated in FIG. 15 are described in order of step number.

(Step S211) The synchronization establishing unit 213 measures received power levels of neighboring cells on the basis of pilot signals received from the base stations 100 and 100a.

(Step S212) The control information processing unit 222 determines whether there is a cell having a higher received power level than the cell of the base station 100, on the basis of the measurement result of step S211. If there is a cell having a higher received power level, the process proceeds to step S213. If not, the process proceeds to step S211.

(Step S213) The control information processing unit 222 generates a handover request. The radio transmission unit 235 transmits the handover request to the base station 100. The radio reception unit 211 receives a handover instruction from the base station 100.

(Step S214) The synchronization establishing unit 213 calculates the difference in timing of receiving frames and symbols between the base station 100 and the base station 100a. The reception timing of the base station 100a is already detected in step S211.

(Step S215) The control information processing unit 225a generates, as Layer 3 control information, timing difference information indicating the timing difference calculated in step S214. The radio transmission unit 255 transmits the timing difference information to the mobile station 300.

(Step S216) The control information processing unit 222 executes a handover for switching the destination from the base station 100 to the base station 100a.

(Step S217) The synchronization establishing unit 213 establishes synchronization with the base station 100a, on the basis of the reception timing detected in step S211.

Figure 16:
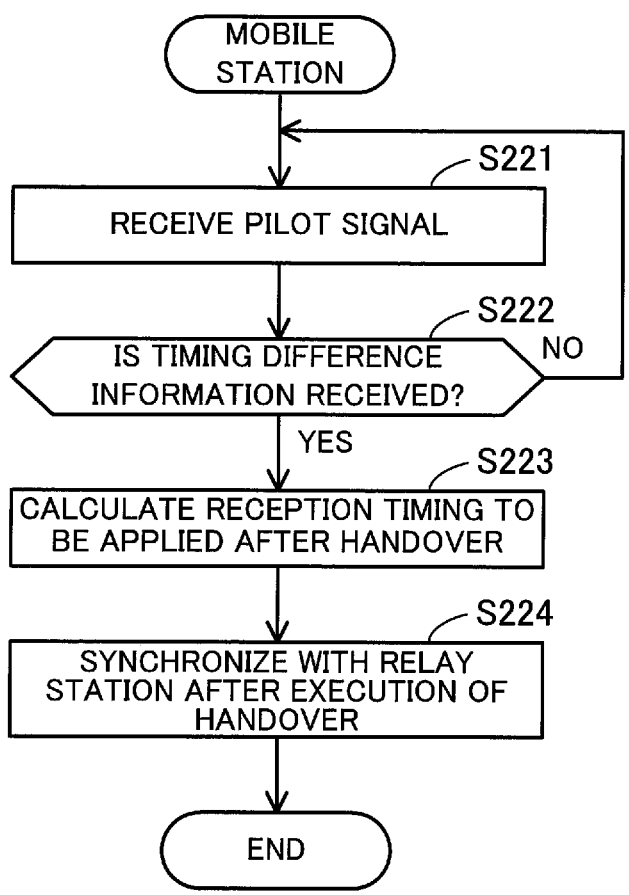
FIG. 16 is a flowchart illustrating operations of the mobile station according to the third embodiment.

FIG. 16 is a flowchart illustrating operations of the mobile station according to the third embodiment. In the following, the operations illustrated in FIG. 16 are described in order of step number.

(Step S221) The radio reception unit 311 receives a pilot signal from the relay station 200a. The synchronization establishing unit 313 maintains synchronization with the relay station 200a, on the basis of the reception timing of the pilot signal.

(Step S222) The control information processing unit 322 determines whether timing difference information is received from the relay station 200a. If timing difference information is received, the process proceeds to step S223. If not, the process proceeds to step S221.

(Step S223) The control information processing unit 322 transmits the timing difference information received from the relay station 200a to the synchronization establishing unit 313. The synchronization establishing unit 313 calculates a reception timing to be applied after execution of a handover by the relay station 200a, on the basis of the current reception timing of frames and symbols and the timing difference information, so as to prepare for synchronization.

(Step S224) After execution of a handover by the relay station 200, the synchronization establishing unit 313 establishes synchronization with the relay station 200a, on the basis of the reception timing calculated in step S223.

Figure 17:
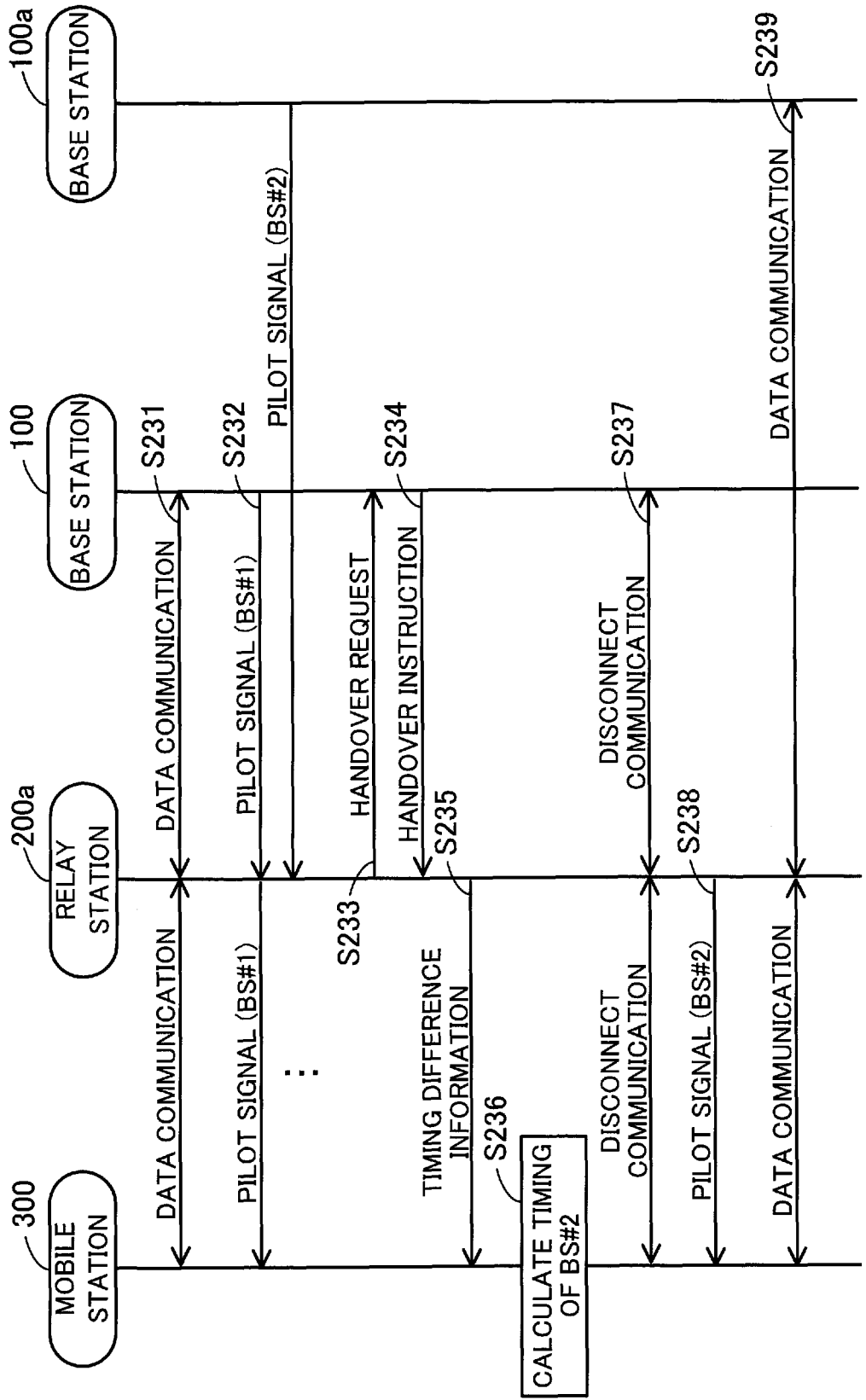
FIG. 17 illustrates a sequence diagram illustrating the flow of handover control according to the third embodiment.

FIG. 17 illustrates a sequence diagram illustrating the flow of handover control according to the third embodiment. In the following, operations of FIG. 17 are described in order of step number.

(Step S231) The relay station 200a connects to and synchronizes with the base station 100. The mobile station 300 performs data communication with the base station 100 via the relay station 200a.

(Step S232) The base stations 100 and 100a transmit pilot signals. The relay station 200a transmits a pilot signal at a timing corresponding to the base station 100. Further, the relay station 200a measures the received power levels of the cells of the base stations 100 and 100a.

(Step S233) The relay station 200a detects that the received power level of the cell of the base station 100a is higher than that of the cell of the base station 100, and transmits a handover request to the base station 100.

(Step S234) The base station 100 confirms that a handover to the base station 100*a* is executable, and transmits a handover instruction to the relay station 200*a*.

(Step S235) The relay station 200*a* calculates the difference in reception timing between the base station 100 and the base station 100*a*, and transmits timing difference information to the mobile station 300.

(Step S236) The mobile station 300 calculates a reception timing to be applied after execution of a handover, on the basis of the current reception timing and the timing difference information.

(Step S237) The relay station 200*a* performs a handover for switching the destination from the base station 100 to the base station 100*a*.

(Step S238) The relay station 200*a* transmits a pilot signal at a timing corresponding to the base station 100*a*. When the mobile station 300 becomes out of synchronization with the relay station 200*a*, the mobile station 300 attempts to receive a pilot signal at the reception timing calculated in step S236, and establishes synchronization.

(Step S239) The mobile station 300 starts data communication with the base station 100*a* via the relay station 200*a* after execution of the handover.

Figure 18:
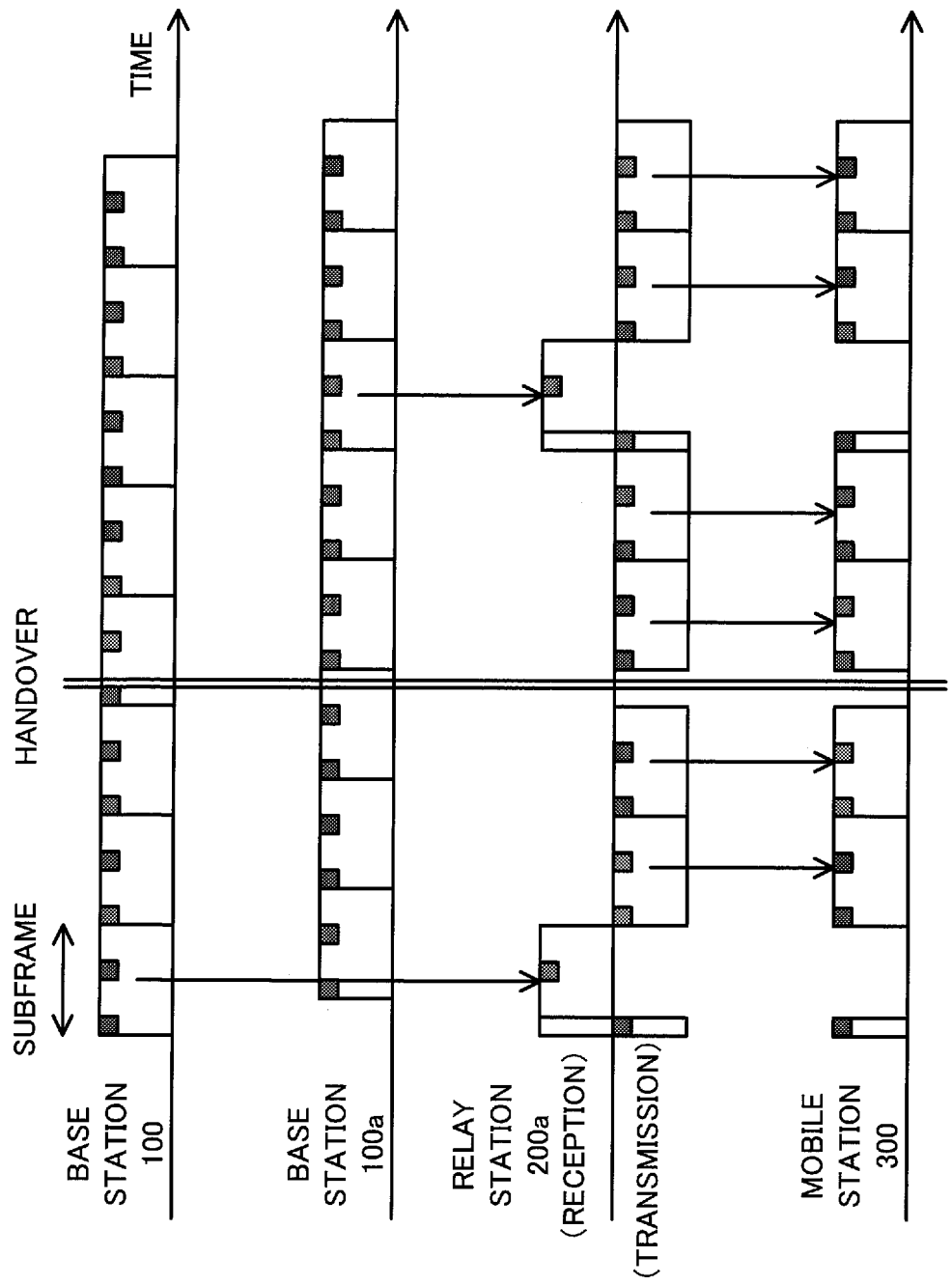
FIG. 18 illustrates an example of reception of pilot signals according to the third embodiment.

FIG. 18 illustrates an example of reception of pilot signals according to the third embodiment. The relay station 200*a* transmits to the mobile station 300 a pilot signal in a subframe in which the relay station 200*a* does not receive radio signals from the base station 100. Further, before executing a handover, the relay station 200*a* transmits timing difference information to the mobile station 300. The mobile station 300 prepares for synchronization on the basis of the timing difference information. Then, the relay station 200*a* executes a handover, and transmits to the mobile station 300 a pilot signal in a subframe in which the relay station 200*a* does not receive radio signals from the base station 100*a*. When the mobile station 300 detects that the mobile station 300 is out of synchronization, the mobile station 300 switches the reception timing so as to re-establish synchronization with the relay station 200*a*.

In the above-described mobile communication system of the third embodiment, as in the case of the second embodiment, even when the relay station 200*a* performs a handover, it is possible to prevent the mobile station 300 that performs data communication from being affected by the handover. That is, before a handover by the relay station 200, the mobile station 300 may receive timing difference information, and may calculate a reception timing to be applied after the handover. Therefore, the mobile station 300 may quickly capture a pilot signal that is transmitted at a new timing so as to establish synchronization. Thus, it is possible to reduce the time lag in resuming data communication.

Fourth Embodiment

Next, a description will be given of a fourth embodiment. The following mainly describes the differences from the second embodiment, and description of the same features as those of the second embodiment will be omitted. A mobile communication system of the fourth embodiment is different from that of the second and third embodiments in the method used by a mobile station to detect a reception timing to be applied after a handover.

The base station of the fourth embodiment may be implemented with the same block configuration as that of the base station 100 of the second embodiment illustrated in FIG. 5. Further, the relay station of the third embodiment may be implemented with the same block configuration as that of the relay station 200 of the second embodiment illustrated in FIGS. 6 and 7. As for the base station and the relay station, the same reference numerals as those of the second embodiment are used in the following description.

Figure 19:
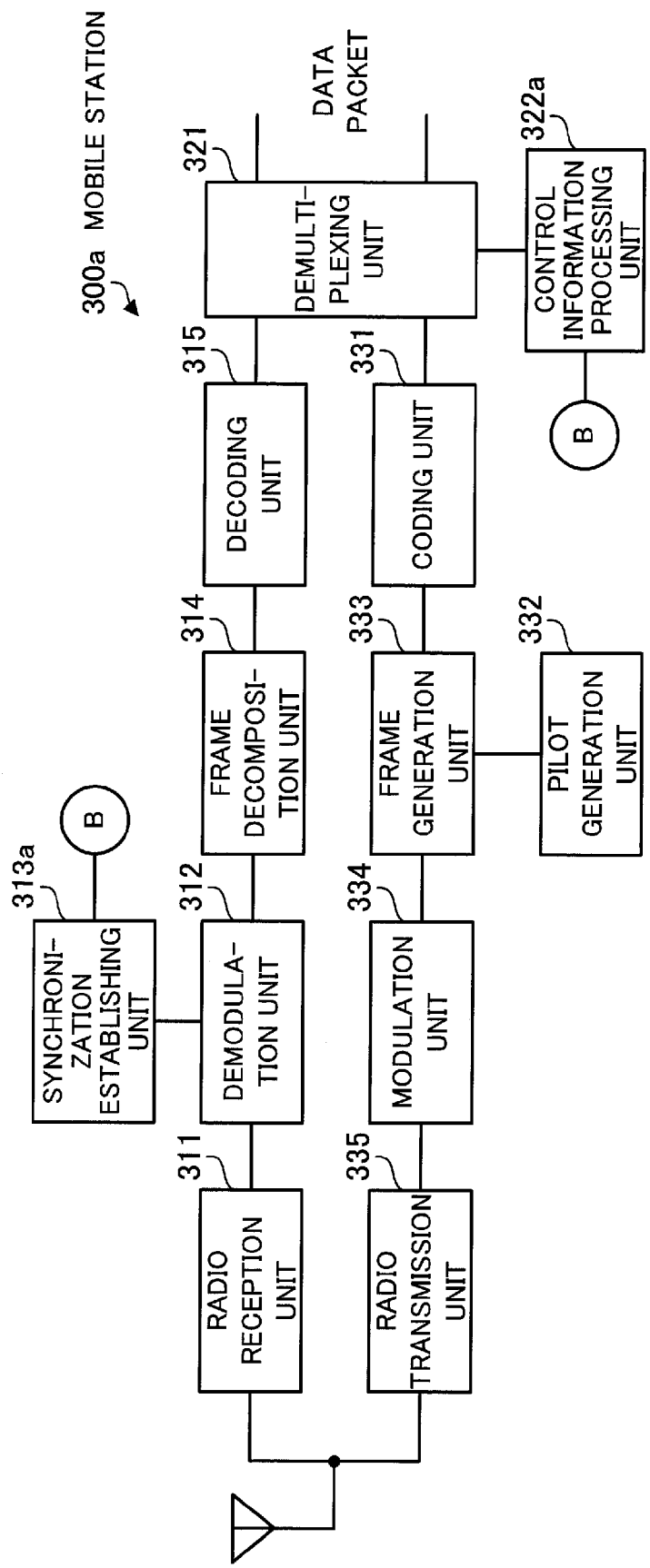
FIG. 19 is a block diagram of a mobile station according to a fourth embodiment.

FIG. 19 is a block diagram of the mobile station according to the fourth embodiment. A mobile station 300*a* of the fourth embodiment includes a synchronization establishing unit 313*a* and a control information processing unit 322*a*, in place of the synchronization establishing unit 313 and the control information processing unit 322 of the mobile station 300. Note that a group including the synchronization establishing unit 313*a* and the control information processing unit 322*a* may be considered as an example of the synchronization unit 32 of the first embodiment.

Before the relay station 200 executes a handover, the synchronization establishing unit 313*a* detects a pilot signal transmitted from the base station 100*a*, in accordance with an instruction from the control information processing unit 322*a*. Then, the synchronization establishing unit 313*a* prepares to synchronize with the relay station 200 after execution of a handover, on the basis of the detected pilot signal, and quickly establishes synchronization after the handover.

The control information processing unit 322*a* obtains reception instruction information from the relay station 200 as Layer 3 control information, before the relay station 200 executes a handover. The reception instruction information instructs reception of a pilot signal from the handover destination base station 100*a*. The reception instruction information includes information used for reception processing, such as identification information of the base station 100*a*, a code used by the base station 100*a*, and the like, for example. Upon receiving the reception instruction information, the control information processing unit 322*a* instructs the synchronization establishing unit 313*a* to receive a pilot signal of the base station 100*a*.

Figure 20:
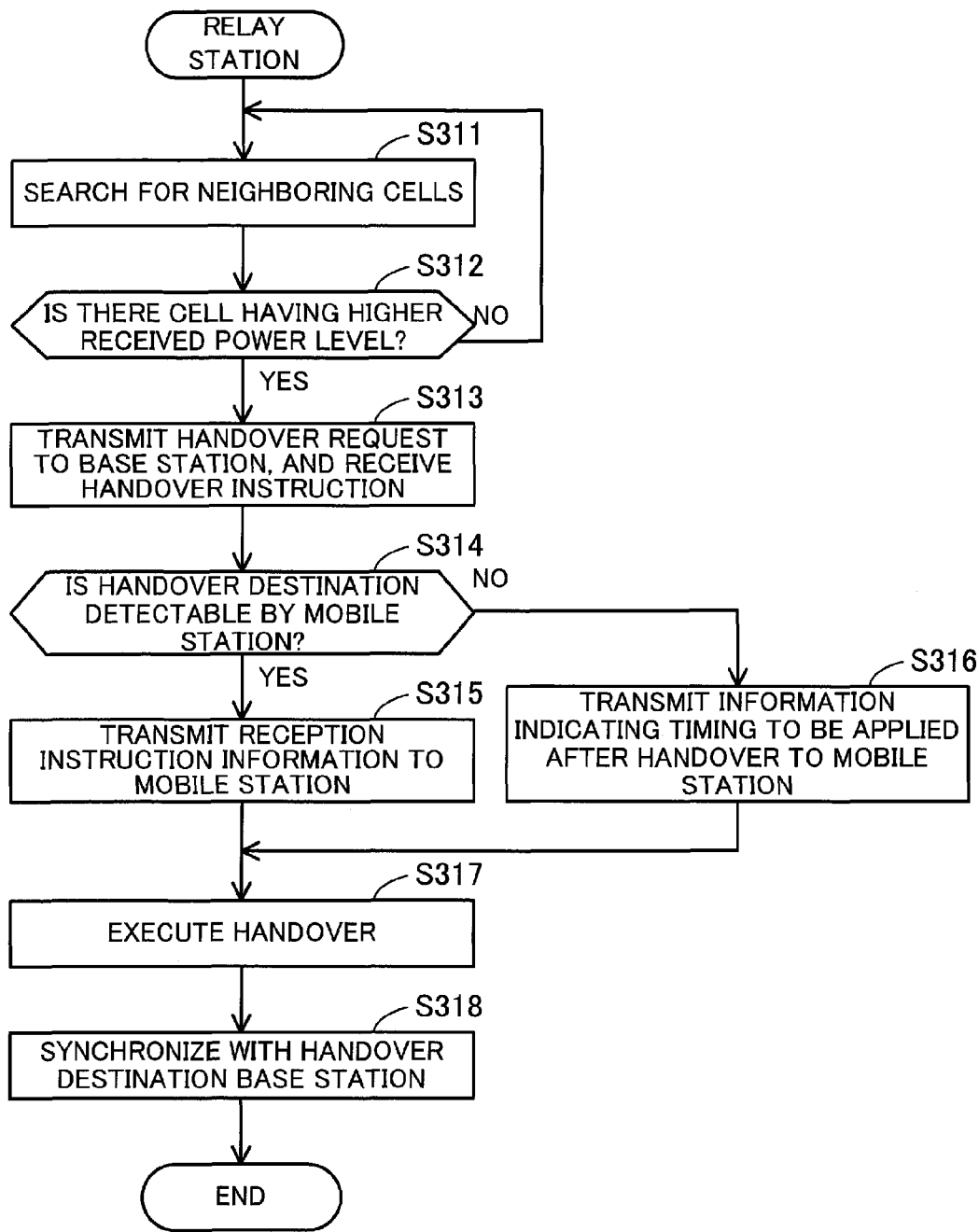
FIG. 20 is a flowchart illustrating operations of the relay station according to the fourth embodiment.

FIG. 20 is a flowchart illustrating operations of the relay station according to the fourth embodiment. In the following, the operations illustrated in FIG. 20 are described in order of step number.

(Step S311) The synchronization establishing unit 213 measures received power levels of neighboring cells on the basis of pilot signals received from the base stations 100 and 100*a*.

(Step S312) The control information processing unit 222 determines whether there is a cell having a higher received power level than the cell of the base station 100, on the basis of the measurement result of step S311. If there is a cell having a higher received power level, the process proceeds to step S313. If not, the process proceeds to step S311.

(Step S313) The control information processing unit 222 generates a handover request. The radio transmission unit 235 transmits the handover request to the base station 100. The radio reception unit 211 receives a handover instruction from the base station 100.

(Step S314) The control information processing unit 225 determines whether a pilot signal transmitted from the handover destination base station 100*a* is detectable by the mobile station 300*a*. For example, the control information processing unit 225 determines whether radio signals received by the mobile station 300*a* from the base station 100*a* have a predetermined level or higher, on the basis of reception quality information obtained from the mobile station 300*a*. If control information processing unit 225 determines that a pilot signal transmitted from the base station 100a is detectable, the process proceeds to step S315. If not, the process proceeds to step S316.

(Step S315) The control information processing unit 225 generates, as Layer 3 control information, a reception instruction information including information about the base station 100a. The radio transmission unit 255 transmits the reception instruction information to the mobile station 300a. Then, the process proceeds to step S317.

(Step S316) The control information processing unit 225 transmits, to the mobile station 300a, information indicating a reception timing to be applied after a handover, using another method (for example, the method of the second or third embodiment).

(Step S317) The control information processing unit 222 executes a handover for switching the destination from the base station 100 to the base station 100a.

(Step S318) The synchronization establishing unit 213 establishes synchronization with the base station 100a, on the basis of the reception timing detected in step S311.

Figure 21:
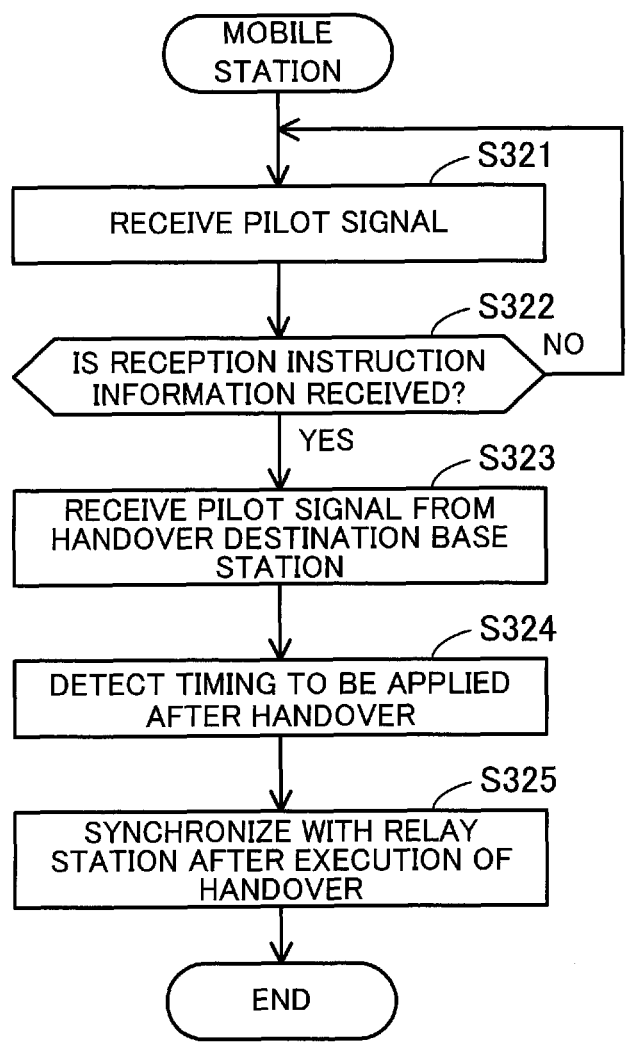
FIG. 21 is a flowchart illustrating operations of the mobile station according to the fourth embodiment.

FIG. 21 is a flowchart illustrating operations of the mobile station according to the fourth embodiment. In the following, the operations illustrated in FIG. 21 are described in order of step number.

(Step S321) The radio reception unit 311 receives a pilot signal from the relay station 200. The synchronization establishing unit 313a maintains synchronization with the relay station 200, on the basis of the reception timing of the pilot signal.

(Step S322) The control information processing unit 322a determines whether reception instruction information is received from the relay station 200. If reception instruction information is received, the process proceeds to step S323. If not, the process proceeds to step S321.

(Step S323) The radio reception unit 311 receives radio signals from the base station 100a. The synchronization establishing unit 313a searches for a pilot signal of the base station 100a.

(Step S324) The synchronization establishing unit 313a detects a reception timing of frames and symbols to be applied after a handover is executed by the relay station 200, on the basis of the pilot signal of the base station 100a detected in step S323.

(Step S325) After execution of a handover by the relay station 200, the synchronization establishing unit 313a establishes synchronization with the relay station 200, on the basis of the reception timing detected in step S324.

Figure 22:
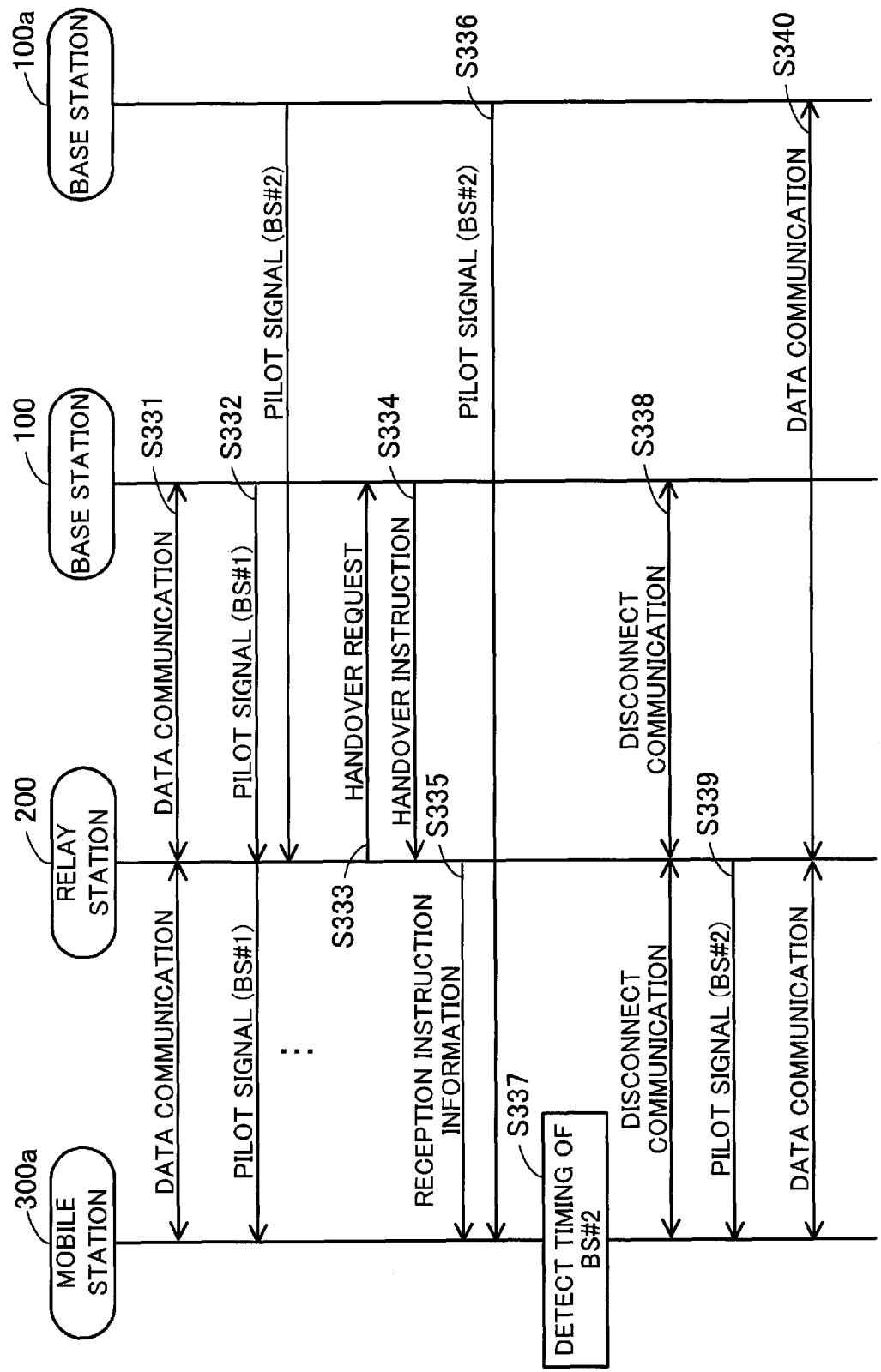
FIG. 22 illustrates a sequence diagram illustrating the flow of handover control according to the fourth embodiment.

FIG. 22 illustrates a sequence diagram illustrating the flow of handover control according to the fourth embodiment. In the following, operations of FIG. 22 are described in order of step number.

(Step S331) The relay station 200 connects to and synchronizes with the base station 100. The mobile station 300 performs data communication with the base station 100 via the relay station 200.

(Step S332) The base stations 100 and 100a transmit pilot signals. The relay station 200 transmits a pilot signal at a timing corresponding to the base station 100. Further, the relay station 200 measures received power levels on the basis of the pilot signals of the base stations 100 and 100a.

(Step S333) The relay station 200 detects that the received power level of the cell of the base station 100a is higher than that of the cell of the base station 100, and transmits a handover request to the base station 100.

(Step S334) The base station 100 confirms that a handover to the base station 100a is executable, and transmits a handover instruction to the relay station 200.

(Step S335) The relay station 200 transmits reception instruction information to the mobile station 300a.

(Step S336) The base station 100a transmits a pilot signal. The mobile station 300a receives the pilot signal from the base station 100a.

(Step S337) The mobile station 300a detects a reception timing of the pilot signal from the base station 100a, and detects a reception timing from the relay station 200 to be applied after a handover.

(Step S338) The relay station 200 performs a handover for switching the destination from the base station 100 to the base station 100a.

(Step S339) The relay station 200 transmits a pilot signal at a timing corresponding to the base station 100a. When the mobile station 300a becomes out of synchronization with the relay station 200, the mobile station 300a attempts to receive a pilot signal at the reception timing detected in step S337, and re-establishes synchronization.

(Step S340) The mobile station 300a starts data communication with the base station 100a via the relay station 200 after execution of the handover.

FIG. 23 illustrates an example of reception of pilot signals according to the fourth embodiment. The relay station 200 transmits to the mobile station 300a a pilot signal in a subframe in which the relay station 200 does not receive radio signals from the base station 100. Further, before executing a handover, the relay station 200 transmits reception instruction information to the mobile station 300a. Upon receiving the reception instruction information, the mobile station 300a receives a pilot signal of the base station 100a, in addition to a pilot signal of the relay station 200, and prepares for synchronization. Then, the relay station 200 executes a handover, and transmits to the mobile station 300a a pilot signal in a subframe in which the relay station 200 does not receive radio signals from the base station 100a. When the mobile station 300a detects that the mobile station 300a is out of synchronization, the mobile station 300a switches the reception timing so as to re-establish synchronization with the relay station 200.

In the above-described mobile communication system of the fourth embodiment, as in the cases of the second and third embodiments, even when the relay station 200 performs a handover, it is possible to prevent the mobile station 300a that performs data communication from being affected by the handover. That is, before a handover by the relay station 200, the mobile station 300a may receive a pilot signal from the base station 100a, and may detect a reception timing to be applied after the handover. Therefore, the mobile station 300a may quickly capture a pilot signal that is transmitted at a new timing so as to establish synchronization. Thus, it is possible to reduce the time lag in resuming data communication.

According to the radio communication method, relay station, mobile station, and mobile communication system described above, it is possible to prevent communication of a mobile station from being affected by a handover performed by a relay station.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A radio communication method for a mobile communication system in which a relay station connects to a first or second base station as a destination and communicates with a mobile station at a timing corresponding to the destination base station, the method comprising:
transmitting, by the relay station, a first pilot signal corresponding to the first base station and a second pilot signal corresponding to the second base station, before disconnection between the first base station and the relay station in a handover for switching the destination of the relay station from the first base station to the second base station, to the mobile station;
calculating, by the mobile station, a communication timing of the relay station to be applied after the handover, by detecting the second pilot signal before the handover; and
establishing, by the mobile station, synchronization with the relay station after execution of the handover, on the basis of the calculated communication timing.

2. The radio communication method according to claim 1, wherein
when a data signal is already allocated to a radio resource to be used for transmission of the second pilot signal, the relay station transmits the second pilot signal in place of the data signal or in a manner superimposed on the data signal.

3. The radio communication method according to claim 1, wherein
the relay station uses, as the second pilot signal, a signal different from the first pilot signal.

4. The radio communication method according to claim 1, wherein:
the relay station detects a difference in communication timing between the first base station and the second base station, and transmits time difference information indicating the difference in communication timing as the second pilot signal; and
the mobile station calculates the communication timing of the relay station to be applied after the handover, on the basis of the time difference information received from the relay station.

5. The radio communication method according to claim 1, wherein:
the relay station transmits, to the mobile station, information that instructs reception of a radio signal transmitted from the second base station, as a signal regarding the second base station; and
the mobile station detects the radio signal transmitted from the second base station, and calculates the communication timing of the relay station to be applied after the handover on the basis of a detection result.

6. The radio communication method according to claim 5, wherein
the relay station determines whether the radio signal transmitted by the second base station is detectable by the mobile station, on the basis of reception quality information obtained from the mobile station, and transmits the information that instructs reception only when the relay station determines that the radio signal is detectable.

7. A relay station that relays communication between first and second base stations and a mobile station, the relay station comprising:
a memory;
at least one processor configured to:
establish synchronization with the first base station and, when a handover for switching a destination from the first base station to the second base station is executed, establish synchronization with the second base station; and
transmit, before disconnection between the first base station and the relay station in the handover, to the mobile station a first pilot signal corresponding to the first base station and a second pilot signal corresponding to the second base station which is to be used by the mobile station for calculating a communication timing of the relay station to be applied after the handover, by detecting the second pilot signal before the handover, wherein the mobile station establishes synchronization with the relay station after execution of the handover, on the basis of the calculated communication timing.

8. A mobile station comprising:
a memory;
at least one processor configured to:
receive a radio signal from a relay station that connects to a first or second base station; and
receive a first pilot signal corresponding to the first base station and a second pilot signal corresponding to the second base station transmitted from the relay station before disconnection between the first base station and the relay station in a handover for switching a destination of the relay station from the first base station to the second base station is executed, and calculate a communication timing of the relay station to be applied after the handover, by detecting the second pilot signal before the handover, and establish synchronization with the relay station after execution of the handover on the basis of the calculated communication timing.

9. A mobile communication system comprising:
first and second base stations;
a relay station configured to connect to a first or second base station as a destination and perform communication at a timing corresponding to the destination base station; and
a mobile station configured to communicate with the relay station;
wherein the relay station transmits a first pilot signal corresponding to the first base station and a second pilot signal corresponding to the second base station, before disconnection between the first base station and the relay station in a handover for switching a destination of the relay station from the first base station to the second base station, to the mobile station; and
wherein the mobile station calculates a communication timing of the relay station to be applied after the handover, by detecting the second pilot signal before the handover, and synchronizes with the relay station after execution of the handover, on the basis of the calculated communication timing.

* * * * *